(12) United States Patent
Seo et al.

(10) Patent No.: US 10,750,164 B2
(45) Date of Patent: Aug. 18, 2020

(54) USER INTERFACE APPARATUS FOR VEHICLE, AND VEHICLE

(71) Applicant: LG ELECTRONICS INC., Seoul (KR)

(72) Inventors: Yuna Seo, Seoul (KR); Minsick Park, Seoul (KR); Minjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 15/783,490

(22) Filed: Oct. 13, 2017

(65) Prior Publication Data

US 2018/0205944 A1 Jul. 19, 2018

(30) Foreign Application Priority Data

Jan. 18, 2017 (KR) ........................ 10-2017-0008796

(51) Int. Cl.

| | |
|---|---|
| *H04N 13/383* | (2018.01) |
| *B60R 1/00* | (2006.01) |
| *G06K 9/00* | (2006.01) |
| *H04N 13/117* | (2018.01) |
| *H04N 13/31* | (2018.01) |
| *H04N 13/378* | (2018.01) |
| *H04N 13/239* | (2018.01) |
| *H04N 13/307* | (2018.01) |
| *H04N 13/305* | (2018.01) |

(52) U.S. Cl.
CPC ............. *H04N 13/383* (2018.05); *B60R 1/00* (2013.01); *G06K 9/00845* (2013.01); *H04N 13/117* (2018.05); *H04N 13/31* (2018.05); *H04N 13/378* (2018.05); *B60R 2300/107* (2013.01); *H04N 13/239* (2018.05); *H04N 13/305* (2018.05); *H04N 13/307* (2018.05)

(58) Field of Classification Search
CPC .................................................... H04N 13/383
USPC .......................................................... 348/43
See application file for complete search history.

(56) References Cited

U.S. PATENT DOCUMENTS

| | | | | |
|---|---|---|---|---|
| 2015/0085076 | A1* | 3/2015 | Lockhart | ................. G06F 3/048 348/46 |
| 2015/0086108 | A1* | 3/2015 | Craig | ..................... G06F 21/32 382/154 |
| 2015/0339527 | A1* | 11/2015 | Plummer | ........... G06K 9/00845 348/78 |
| 2016/0046298 | A1 | 2/2016 | DeRuyck et al. | |
| 2016/0057412 | A1 | 2/2016 | Lee et al. | |

FOREIGN PATENT DOCUMENTS

WO WO 2005/052851 A2 6/2005

\* cited by examiner

*Primary Examiner* — Eileen M Adams
*Assistant Examiner* — Daniel T Tekle
(74) *Attorney, Agent, or Firm* — Birch, Stewart, Kolasch & Birch, LLP

(57) ABSTRACT

Disclosed is a user interface apparatus for a vehicle, the apparatus including: a display unit configured to output stereoscopic content; an internal camera configured to acquire an image of the inside of the vehicle; and a processor configured to detect an image of a head of a user of the vehicle based on the image of the inside of the vehicle, generate pose information and movement information of the head based on the image of the head, and set a virtual head box based on a method for implementing the stereoscopic content, the pose information, and the movement information.

19 Claims, 25 Drawing Sheets

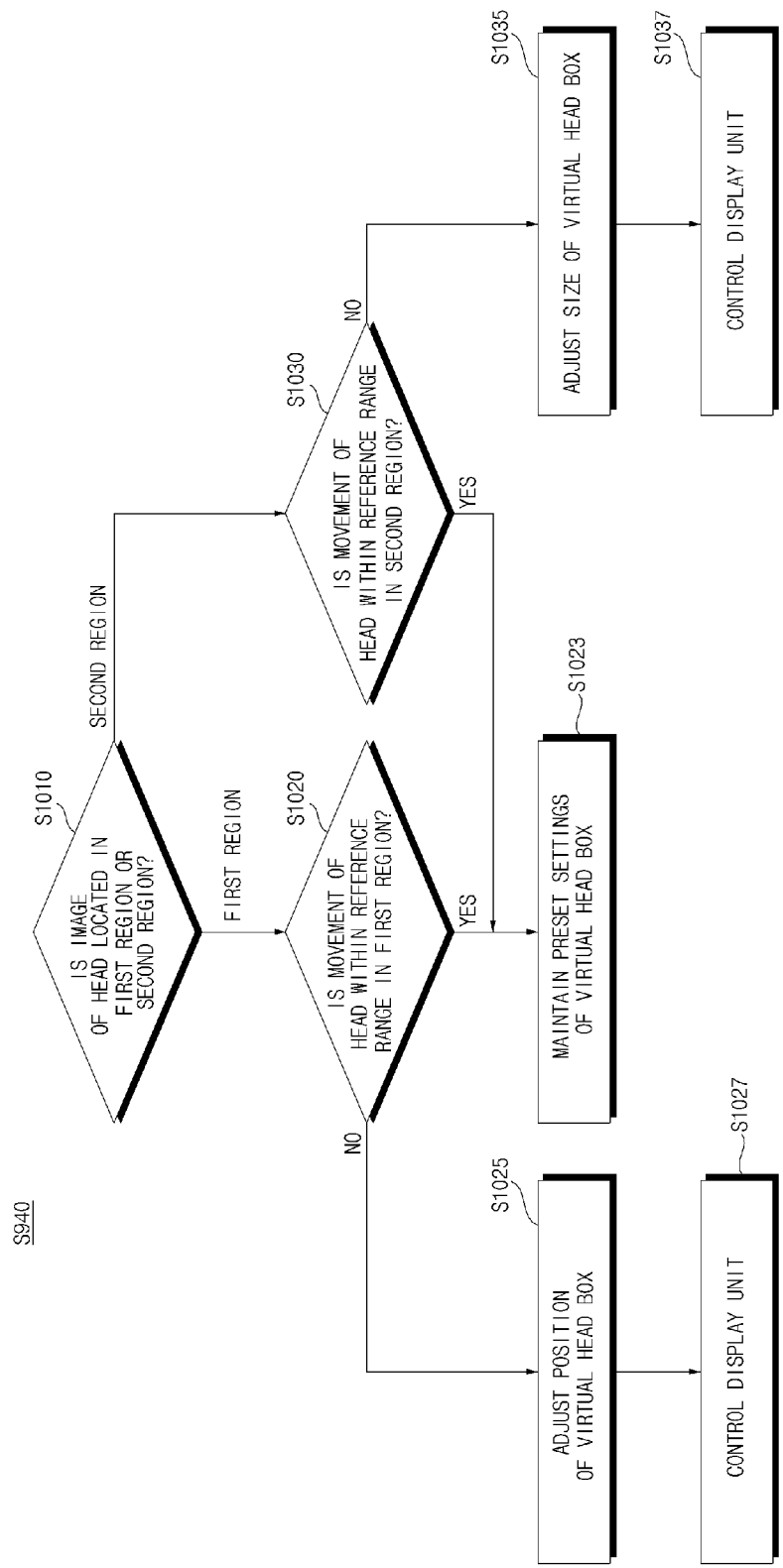

S1970

USER INTERFACE APPARATUS FOR VEHICLE, AND VEHICLE

CROSS-REFERENCE TO RELATED APPLICATION

This application claims the priority benefit of Korean Patent Application No. 10-2017-0008796, filed on Jan. 18, 2017 in the Korean Intellectual Property Office, the disclosure of which is incorporated herein by reference.

BACKGROUND OF THE INVENTION

1. Field of the Invention

Embodiments of the present invention relate to a user interface apparatus for a vehicle, and the vehicle.

2. Description of the Related Art

A vehicle is an apparatus that moves in a direction desired by a user riding therein. A representative example of a vehicle may be an automobile.

Meanwhile, a variety of sensors and electronic devices have been mounted in vehicles for the convenience of a user who uses the vehicle. In particular, for user driving convenience, an Advanced Driver Assistance System (ADAS) has been actively studied. In addition, enormous efforts have been being made to develop autonomous vehicles.

A user interface apparatus is provided in a vehicle. A display device is one of examples of the user interface apparatus. A cluster provided in recent vehicle models is implemented as a display device.

Recently, efforts are being made to display an three-dimensional (3D) image on a display device provided in a vehicle. In order to efficiently perceive the 3D image, a user's head needs to be located at the right position.

If the user's head is not located at a set position, the 3D image may not be perceived by the user or may be viewed in a distorted shape. In such cases, it may lead to confusion to the user who is driving a vehicle, possibly resulting in an accident.

SUMMARY OF THE INVENTION

Embodiments of present invention have been made in view of the above problems, and it is one object of the present invention to provide a user interface apparatus for setting a virtual head box according to a pose and movement of a user's head.

It is another object of the present invention to provide a vehicle comprising a user interface apparatus.

Objects of the present invention should not be limited to the aforementioned objects and other unmentioned objects will be clearly understood by those skilled in the art from the following description.

In accordance with an embodiment of the present invention, the above and other objects can be accomplished by the provision of a user interface apparatus for a vehicle, the apparatus including: a display unit configured to output stereoscopic content; an internal camera configured to acquire an image of the inside of the vehicle; and a processor configured to detect an image of a head of a user of the vehicle based on the image of the inside of the vehicle, generate pose information and movement information of the head based on the image of the head, and set a virtual head box based on a method for implementing the stereoscopic content, the pose information, and the movement information.

The details of other embodiments are included in the following description and the accompanying drawings.

The embodiments of the present invention have one or more effects as follows.

First, as a virtual head box is set based on pose information of a head of a user of the vehicle and movement information of the head and stereoscopic content is accordingly output, valid stereoscopic content may be provided to the user.

Second, as a user is able to accurately perceive stereoscopic content while driving a vehicle, it is possible to improve efficiency of information transmission.

Third, as the virtual head box is adjusted or a filter unit is controlled based on pose information of the head of the user or movement information of the head, stereoscopic content may be provided adaptively according to movement of the user.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein:

FIGS. 10A to 10C are flowcharts illustrating details of operation of a user interface apparatus for a vehicle according to an embodiment of the present invention;

DETAILED DESCRIPTION OF THE EMBODIMENTS

Figure 1:
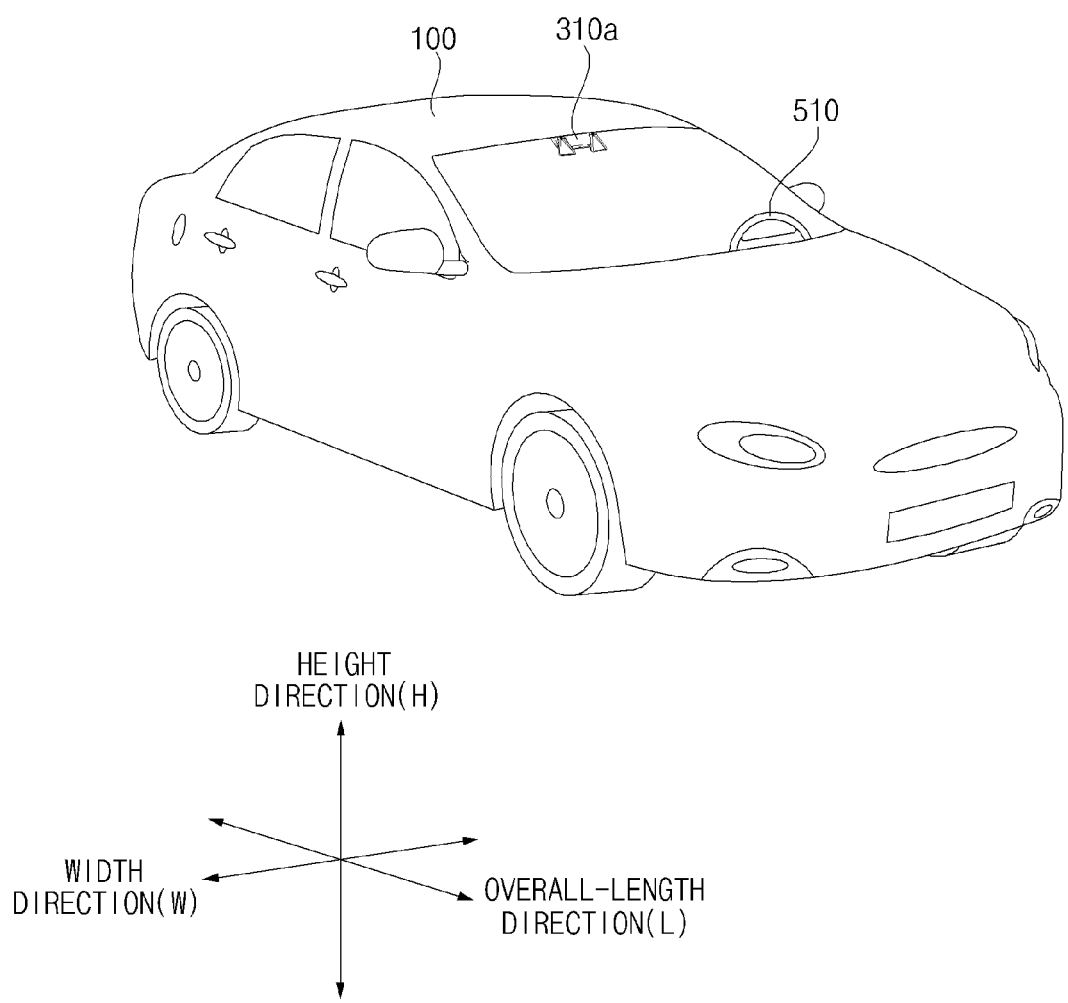
FIG. 1 is a diagram illustrating the external appearance of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram of the external appearance of a vehicle according to an embodiment of the present invention.

Figure 2:
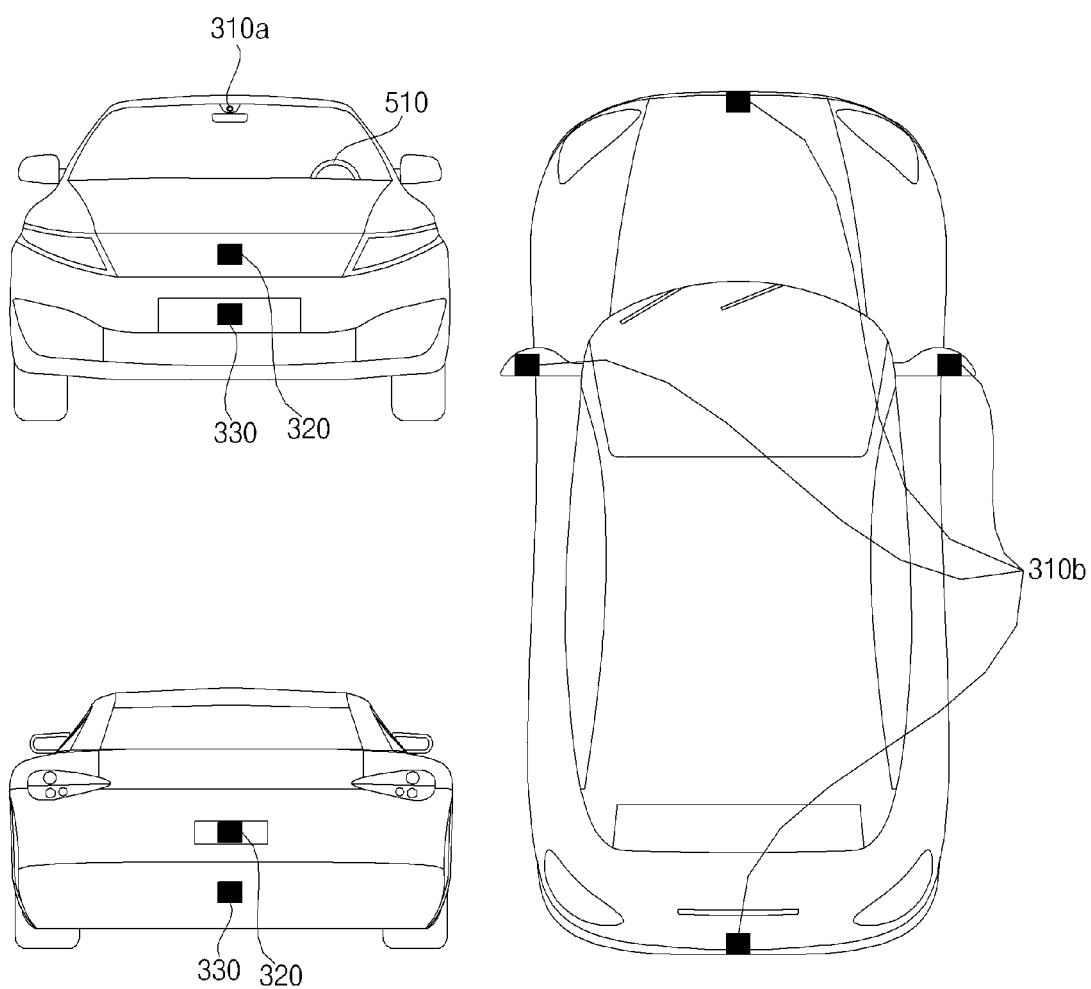
FIG. 2 are different angled views of the external appearance of a vehicle according to an embodiment of the present invention.

FIG. 2 is different angled views of a vehicle according to an embodiment of the present invention.

Figure 3:
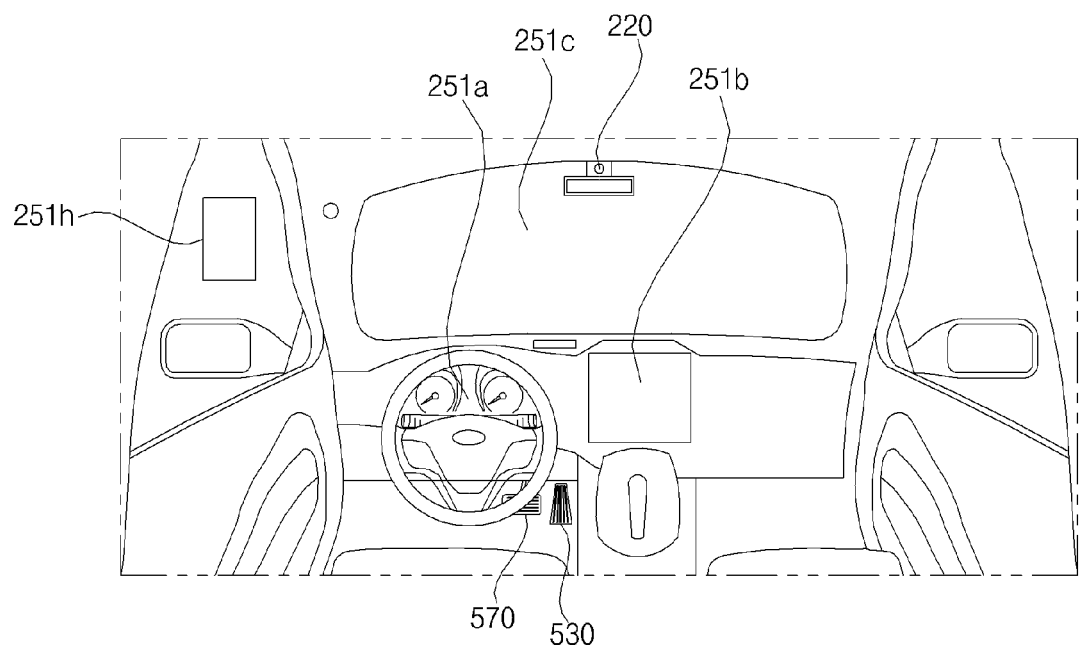
FIGS. 3 and 4 are diagrams illustrating the interior configuration of a vehicle according to an embodiment of the present invention.
Figure 4:
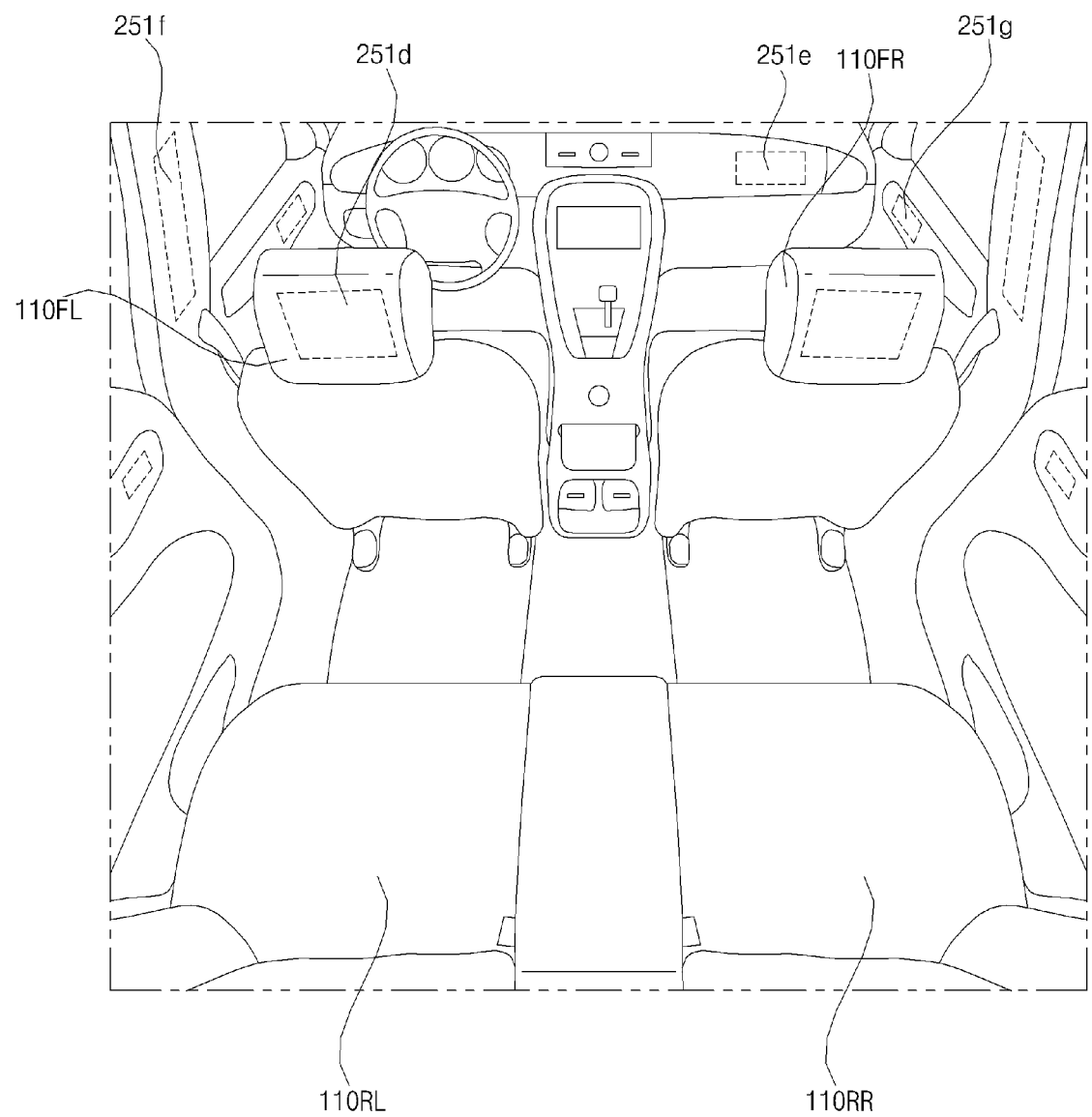

FIGS. 3 and 4 are diagrams of the internal configuration of a vehicle according to an embodiment of the present invention.

Figure 5:
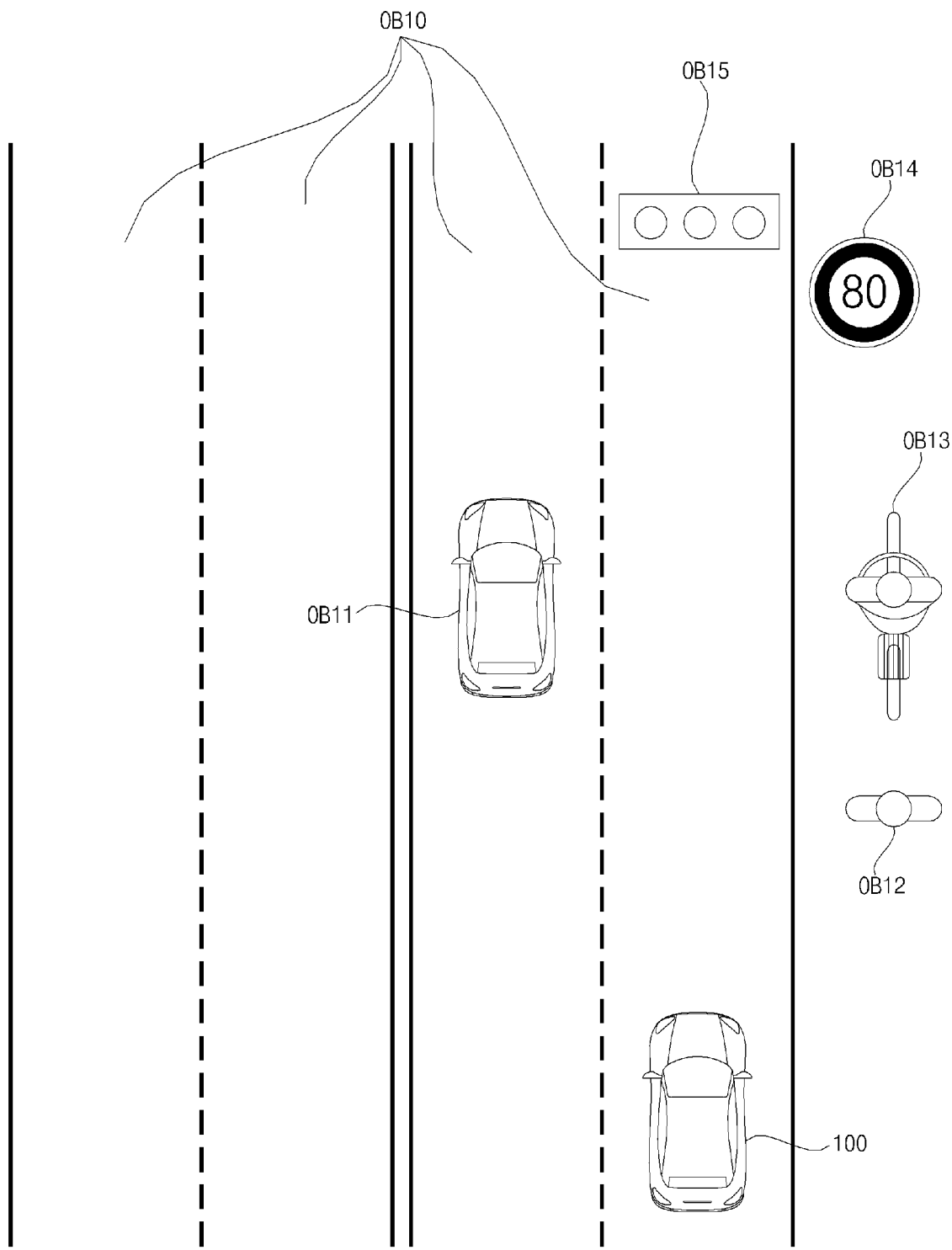
FIGS. 5 and 6 are diagrams for explanation of an object according to an embodiment of the present invention.
Figure 6:
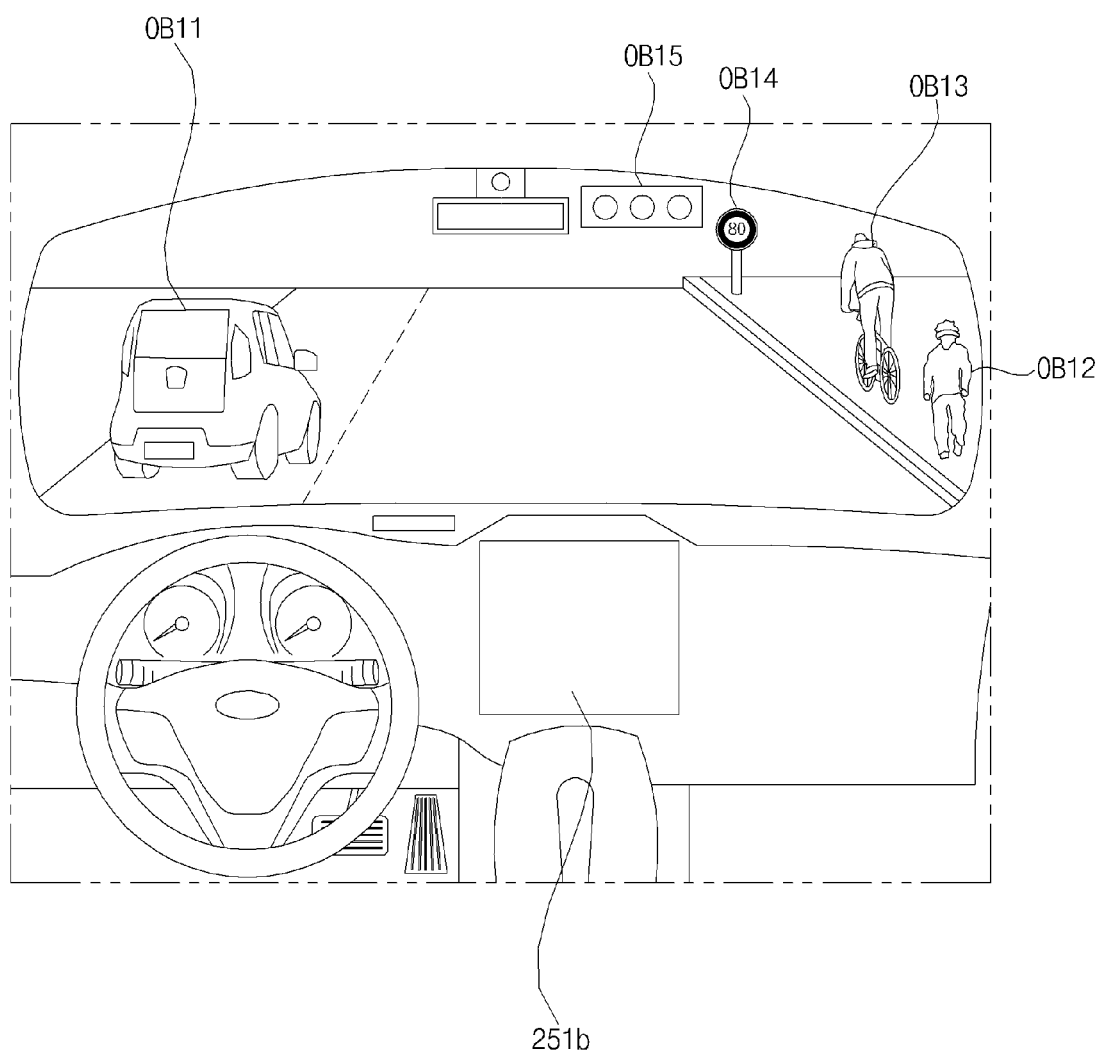

FIGS. 5 and 6 are diagrams for explanation of objects according to an embodiment of the present invention.

Figure 7:
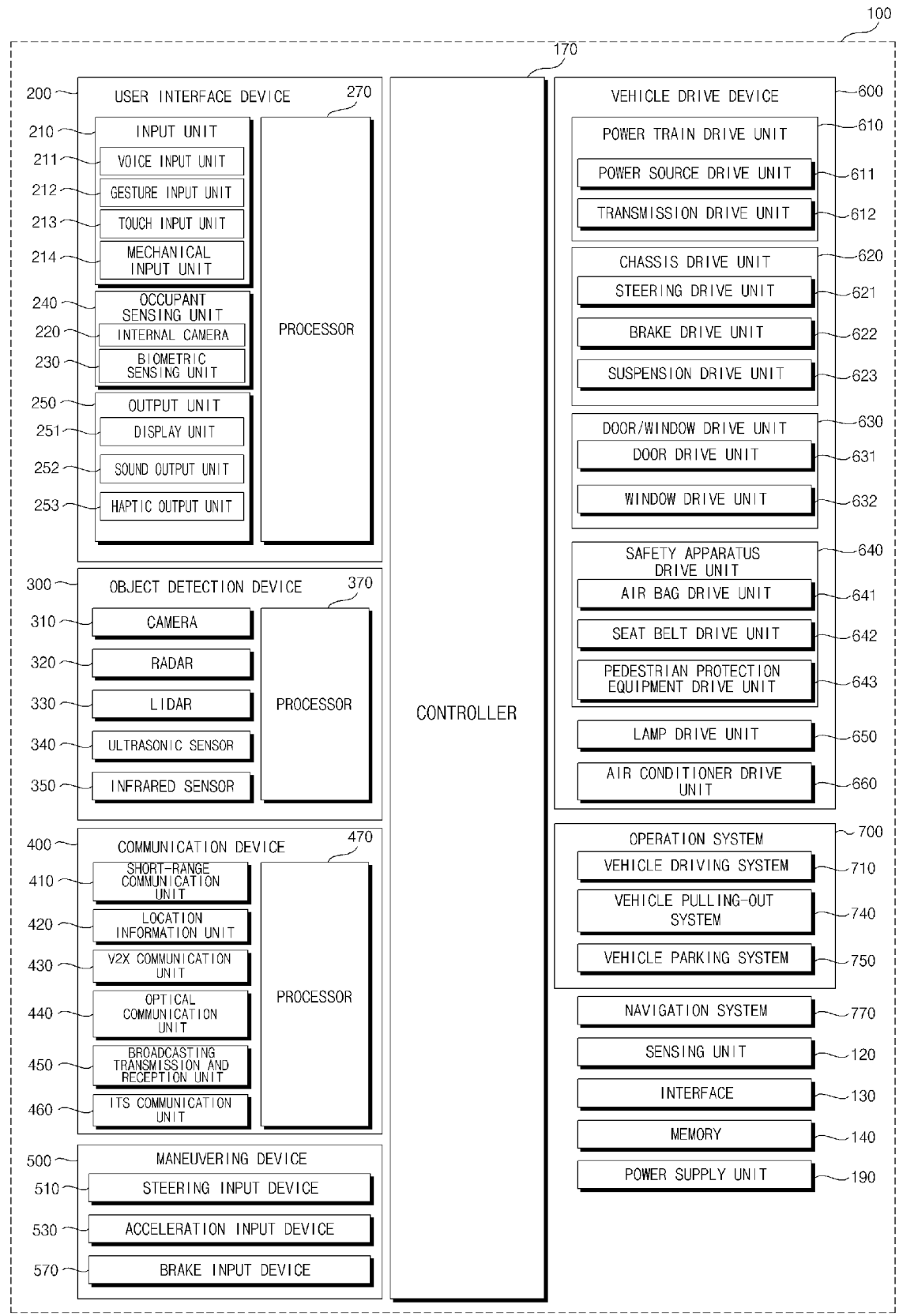
FIG. 7 is a block diagram illustrating a vehicle according to an embodiment of the present invention.

FIG. 7 is a block diagram illustrating a vehicle according to an embodiment of the present invention.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through a user interface apparatus 200, the vehicle 100 may be switched from a manual mode to an autonomous driving mode, or vice versa.

The vehicle 100 may be switched to the autonomous driving mode or to the manual mode based on driving situation information.

The driving situation information may include at least one of the following: information on an object located outside the vehicle 100, navigation information, and vehicle state information.

For example, the vehicle 100 may be switched from the manual mode to the autonomous driving mode, or vice versa, based on driving situation information generated by the object detection device 300.

In another example, the vehicle 100 may be switched from the manual mode to the autonomous driving mode, or vice versa, based on driving situation information received through a communication device 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation device 500. In response to the user input received through the driving manipulation device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection device 300, the communication device 400, the driving manipulation device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some embodiments, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some embodiments, the user interface apparatus 200 may include a plurality of processors 270 or may not include the processor 270.

In a case where the user interface apparatus 200 does not include the processor 270, the user interface apparatus 200 may operate under control of the controller 170 or a processor of a different device inside the vehicle 100.

Meanwhile, the user interface apparatus 200 may be referred to as a display device for vehicle.

The user interface apparatus 200 may operate under control of the controller 170.

The object detection device 300 is configured to detect an object outside the vehicle 100. The objection detection device 300 may generate information on the object based on sensing data.

The information on the object may include information on the presence of the object, location information of the object, information on a distance between the vehicle 100 and the object, and information on a speed of the vehicle relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by utilizing a pin hole model or profiling a road surface.

For example, the camera 310 may acquire the information on a distance to the object and the information on the speed relative to the object, based on information on disparity in stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some embodiments, the object detection device 300 may include a plurality of processors 370 or may not include the processor 370. For example, each of the camera 310, the radar 320, the lidar 330, the ultrasonic sensor 340, and the infrared sensor 350 may include its own processor.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

Meanwhile, the communication device 400 may implement a vehicle display device, together with the user interface apparatus 200. In this case, the vehicle display device may be referred to as a telematics device or an Audio Video Navigation (AVN) device.

The communication device 400 may operate under control of the controller 170.

The driving manipulation device 500 is configured to receive a user input for driving the vehicle 100.

In the manual mode, the vehicle 100 may operate based on a signal provided by the driving manipulation device 500.

The driving manipulation device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The driving manipulation device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some embodiments, the operation system 700 may further include other components in addition to the aforementioned components, or may not include some of the aforementioned component.

Meanwhile, the operation system 700 may include a processor. Each unit of the operation system 700 may include its own processor.

Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface apparatus 270, the object detection device 300, the communication device 400, the driving manipulation device 500, the vehicle drive device 600, the navigation system 770, the sensing unit 120, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 based on information on an object received from the object detection device 300.

The driving system 710 may perform driving of the vehicle 100 by providing a control signal to the vehicle drive device 600 in response to reception of a signal from an external device through the communication device 400.

The driving system 710 may be a system which includes at least one of the user interface apparatus 270, the object detection device 300, the communication device 400, the driving manipulation device 500, the vehicle driving device 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive device 600 in response to reception of navigation information from the navigation system 770.

The parking-out system 740 may perform an operation of pulling the vehicle 100 out of a parking space, by providing a control signal to the vehicle drive device 600 based on information on an object received from the object detection device 300.

The parking-out system 740 may perform an operation of pulling the vehicle 100 out of a parking space, by providing a control signal to the vehicle drive device 600 based on a signal received from an external device.

The parking-out system 740 may be a system which includes at least one of the user interface apparatus 270, the object detection device 300, the communication device 400, the driving manipulation device 500, the vehicle driving device 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive device 600 in response to reception of navigation information from the navigation system 770.

The parking system 750 may perform an operation of parking the vehicle 100 in a parking space, by providing a control signal to the vehicle drive device 600 based on information on an object received from the object detection device 300.

The parking system 750 may perform an operation of parking the vehicle 100 in a parking space, by providing a control signal to the vehicle drive device 600 in response to reception of a signal from an external device.

The parking system 750 may be a system which includes at least one of the user interface apparatus 270, the object detection device 300, the communication device 400, the driving manipulation device 500, the vehicle driving device 600, the navigation system 770, the sensing unit 120, and the controller 170, and which performs an operation of parking the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400.

In some embodiments, the navigation system 770 may be implemented as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
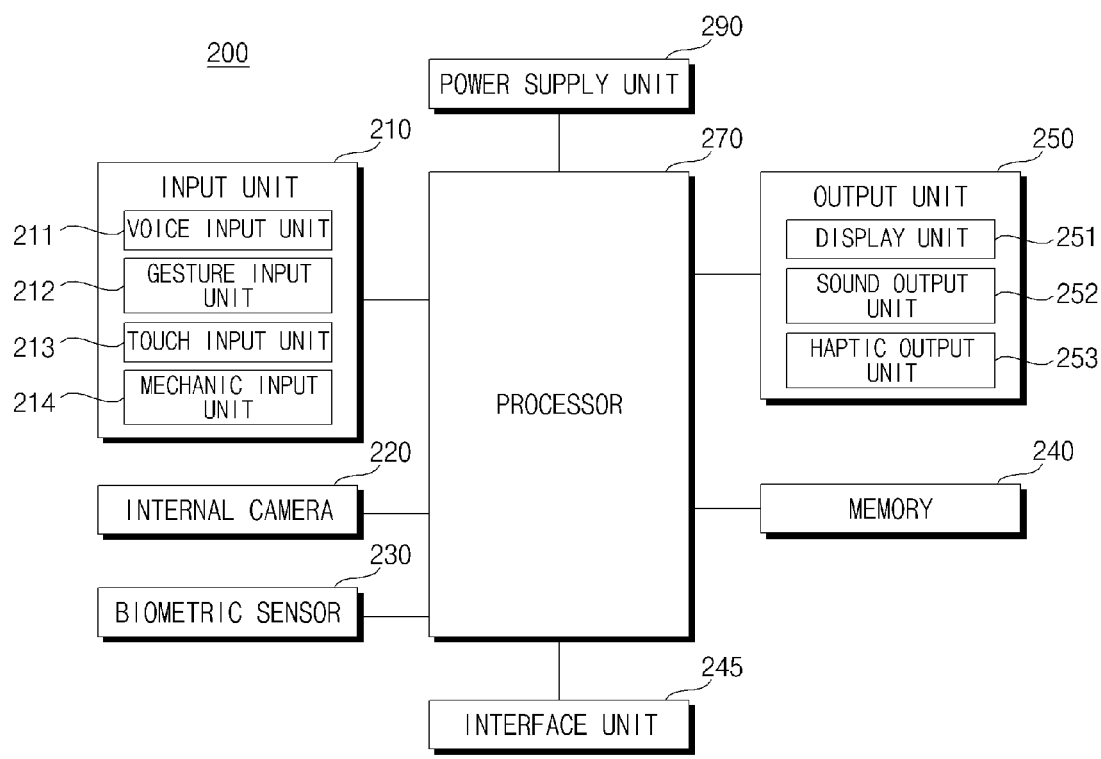
FIG. 8 is a block diagram illustrating a vehicle user interface apparatus according to an embodiment of the present invention.

FIG. 8 is a block diagram illustrating a vehicle user interface according to an embodiment of the present invention.

Referring to FIG. 8, a vehicle user interface 200 may include an input unit 210, an internal camera 220, a biometric sensing unit 230, a memory 240, an interface unit 245, an output unit 250, a processor 270, and a power supply unit 290.

In some embodiments, the user interface apparatus 200 may further include other components in addition to the aforementioned components, or may not include some of the aforementioned components.

The vehicle user interface apparatus 200 shown in FIG. 8 includes the components of the vehicle user interface apparatus 200 shown in FIG. 7. Hereinafter, the same description provided above with reference to FIG. 7 are omitted, and features not mentioned above will be described.

The relevant description provided with reference to FIG. 7 may be applied to the input unit 210, and the biometric sensing unit 232.

The internal camera 220 may acquire an image of the inside of the vehicle 100.

The internal camera 220 may include one or more cameras.

For example, the internal camera 220 may include a stereo camera. In this case, the internal camera 220 may acquire a stereo image of the inside of the vehicle 100. The stereo image may have a disparity level according to a distance between stereo cameras.

The internal camera 220 includes an infrared camera. In this case, the internal camera 220 may acquire an image of the inside of the vehicle 100 even at night when there is no ambient light.

The memory 240 is electrically connected to the processor 270. The memory 240 may store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In some embodiments, the memory may be integrated with the processor 270, or may be implemented as an element of the processor 270.

The interface unit 245 may exchange information, data, or a signal with a different device included in the vehicle 100. The interface unit 245 may transmit the received information, data, or signal to the processor 270. The interface unit 245 may transmit information, data, or a signal generated or processed by the processor 270 to a different device included in the vehicle 100. The interface unit 245 may receive information, data, or a signal from a different device included in the vehicle 100.

The output unit 250 may include a display unit 251, a sound output unit 252, and a haptic output unit 253.

The relevant description provided above with reference to FIG. 7 may be applied to the output unit 250. Hereinafter, the display unit 251 is mainly described.

The display unit 251 may operate under control of the processor 270.

The display unit 251 may output stereoscopic content according to a predetermined method for implementing stereoscopic content.

For example, the display unit 251 may output stereoscopic content based on a lenticular method, a microlens array method, or a parallax method.

The display unit 251 may include an image generation unit and a filter unit.

The image generation unit may display a multi-view image for a first frame duration.

For example, the image generation unit may display a left-eye image and a right-eye image for the first frame duration.

The filter unit may form barrier areas and light transmission areas for a first frame duration.

For example, the barrier areas and the light transmission areas may be formed to correspond to (or match) a left-eye image and a right-eye image.

The display unit 251 will be described in more detail with reference to FIGS. 12 and 13.

The processor 270 may control the overall operation of each unit of the user interface apparatus 200.

The processor 270 may receive an image of the inside of the vehicle 100.

The processor 270 may detect an image of a user's head based on the image of the inside of the vehicle 100.

For example, the processor 270 may detect an image of a user's head by comparing a received image of the inside of the vehicle 100 with data stored in the memory 240.

Throughout the specification, the user's head may be a concept including the user's face. Throughout the specification, the user's head may be used interchangeably with the user's face.

The processor 270 may generate pose information of the user's head and movement information of the user's head based on an image of the user's head.

The pose information of the user's head may include information on position of the user's head. For example, the pose information of the user's head may include information on relative coordinates of the user's head. The relative coordinates may be coordinates relative to the internal camera 220 or the display unit 251.

Pose information of a user's head and movement information of the user's head may be information that is generated when the user's head is positioned within a reference range from the internal camera 220 or the display unit 251. For example, pose information of a user's head and movement information of the user's head may be generated when the user's head is 500 mm to 900 mm away in an overall length direction from the internal camera 220 or the display unit 251.

The processor 270 may generate information on position of the user's eyes and movement information of the user's eyes based on an image of the user's eyes.

The processor 270 may set a virtual head box based on a stereoscopic content implementation method, pose information of a user's head, and movement information of the user's head.

The processor 270 may set a virtual head box based on a stereoscopic content implementation method, information on position of a user's eyes, and movement information of the user's eyes.

Meanwhile, the virtual head box may be defined as a 3D space in which the user's head needs to be positioned so that the user is able to see the stereoscopic content with bare eyes.

The virtual head box may be set before the user uses the vehicle 100.

The virtual head box may be set in the process of manufacturing the user interface apparatus 200 or the vehicle 100 including the user interface apparatus 200.

Setting a virtual head box may include setting the position of the virtual head box and setting the size of the virtual head box.

The processor 270 may control the display unit 251 to output stereoscopic content based on a lenticular method, a microlens array method, or a parallax method.

The processor 270 may detect a preset feature point from an image of a user's head.

A feature point may include at least one of the following: a first point of the left eye, a second point of the left eye, a first point of the right eye, a second point of the right eye, a first point of the lips, a second point of the lips, and a first point of the nose.

The processor 270 may generate pose information of the user's head and movement information of the user's head based on a detected feature point.

For example, the processor 270 may generate pose information of the user's head based on coordinates of a detected feature point.

For example, the processor 270 may track a detected feature point over a plurality of frames, and generate movement information of the user's head based on tracked data.

The processor 270 may detect a feature point from a plurality of frames.

The processor 270 may constantly detect a feature point from a plurality of frames about an image of the inside of the vehicle 100.

The processor 270 may calculate the mean and standard deviation of locations of a feature point detected from a plurality of frames.

A location of a feature point may be expressed as a numeric value.

For example, the processor 270 may calculate the mean and standard deviation of coordinates of a feature point detected from a plurality of frames.

The processor 270 may generate movement information of the user's head based on the calculated mean and standard deviation. The movement information of the user's head may be referred to as information on shaking of the user's head.

The processor 270 may generate information on position of the user's head based on the mean.

The processor 270 may divide an image of the inside of the vehicle 100 into a first region and a second region based on a viewing angle of a camera included in the internal camera 220.

For example, the processor 270 may determine a region corresponding to a first viewing angle range of a camera in an image of the inside of the vehicle 100. The first region may be a central region of the image of the inside of the vehicle 100. The first region may be formed closer to the center of the image of the inside of the vehicle 100, compared to the second region.

For example, the processor 270 may divide an area corresponding to a second viewing angle range of the camera in an image of the inside of the vehicle 100. The second region may be an outer region of the image of the inside of the vehicle 100. The second region may be a region formed in a relatively outer part of the image of the inside of the vehicle 100 as compared to the first region.

The processor 270 may determine whether a feature point is located in the first region or the second region.

When it is determined that the feature point is located in the first region, the processor 270 may determine whether the mean and standard deviation of locations of a feature point are within a reference range in the first region.

The reference range may be a range preset based on experimental results, the range in which a user is able to see stereoscopic content with bare eyes.

When it is determined that the mean and standard deviation of locations of a feature point are within the reference range in the first region, the processor 270 may maintain the preset position and size of the virtual head box.

When at least one of the mean and standard deviation of locations of the feature point is beyond the reference range in the first region, the processor 270 may adjust the preset position of the virtual head box based on the feature point.

The processor 270 may adjust barrier areas and light transmission areas of the filter unit based on the adjusted position of the virtual head box.

For example, the processor 270 may adjust the positions of the barrier areas and the light transmission areas based on the adjusted position of the virtual head box.

The processor 270 may control an image output unit based on the adjusted position of the virtual head box.

For example, the processor 270 may adjust the position of a multi-view image, output from the image output unit, based on the adjusted position of the virtual head box.

As such, by adjusting the position of the virtual head box and the positions of the barrier areas and the light transmission areas, it is possible to output stereoscopic content adaptively to a position of the user's head, thereby adding stability to provision of information through the stereoscopic content.

When it is determined that the feature point is located in the second region, the processor 270 may determine whether the mean and standard deviation of locations of the feature point are within a reference range.

The reference range may be a range preset based on experimental results, the range in which a user is able to see stereoscopic content with bare eyes.

When it is determined that the mean and standard deviation of locations of the feature point is within the reference range in the second region, the processor 270 may maintain the preset position and size of the virtual head box.

When it is determined that at least one of the mean and standard deviation of locations of the feature point is beyond the reference range, the processor 270 may adjust the preset size of the virtual head box based on the mean and standard deviation.

For example, the processor 270 may adjust the preset size of the virtual head box, so that the virtual head box grows in size in an overall length direction or in an overall height direction.

The processor 270 may adjust barrier areas and light transmission areas of the filter unit based on the adjusted size of the virtual head box.

For example, the processor 270 may adjust the size of the barrier areas and the light transmission areas based on the adjusted size of the virtual head box.

For example, the processor 270 may adjust a period of each barrier area or each light transmission area based on the adjusted size of the virtual head box.

The processor 270 may control the image output unit based on the adjusted size of the virtual head box.

For example, the processor 270 may adjust an alternating period of a multi-view image, output from the image output unit, based on the adjusted size of the virtual head box.

The processor 270 may track a detected feature point over a plurality of frames. The processor 270 may generate information on rotation of a user's head based on the tracked feature point.

The processor 270 may determine whether the rotation of the user's head is within a reference range.

The reference range may be a range preset based on experimental values, the range in which a user is able to see stereoscopic content with bare eyes.

When it is determined that the rotation of the user's head is within the reference range, the processor 270 may maintain the preset position and size of the virtual head box.

When it is determined that the rotation of the user's head is beyond the reference range, the processor 270 may control the display unit 251 to convert stereoscopic content into flat content.

The flat content may be non-stereoscopic content that is implemented two-dimensionally.

When the internal camera 220 includes a stereo camera, the processor 270 may receive a stereo image of the inside of the vehicle 100.

The processor 270 may acquire disparity information on a feature point based on the stereo image of the inside of the vehicle 100.

The processor 270 may acquire information on a distance between the user's head and the internal camera 220 or between the user's head and the display unit 251 based on the disparity information.

The processor 270 may determine whether the distance is within a reference range.

The reference range may be a range preset based on experimental values, the range in which a user is able to see stereoscopic content with bare eyes.

When it is determined that the distance is within the reference range, the processor 270 may maintain the preset position and size of the virtual head box.

When it is determined that the distance is beyond the reference range, the processor 270 may adjust the position of the virtual head box.

The processor 270 may adjust barrier areas and light transmission areas of the filter unit based on the adjusted position of the virtual head box.

For example, the processor 270 may adjust the size of the barrier areas and the light transmission areas based on the adjusted position of the virtual head box.

For example, the processor 270 may adjust a period of each barrier area or each light transmission area based on the adjusted position of the virtual head box.

The processor 270 may adjust the barrier areas and the light transmission areas of the filter unit based on the adjusted size of the virtual head box.

For example, the processor 270 may adjust the size of the barrier areas and the light transmission areas based on the adjusted size of the virtual head box.

For example, the processor 270 may adjust a period of each barrier area or each light transmission area based on the adjusted size of the virtual head box.

The processor 270 may control the image output unit based on the adjusted size of the virtual head box.

For example, the processor 270 may adjust an alternating period of a multi-view image, output from the image output unit, based on the adjusted size of the virtual head box.

The power supply unit 290 may supply power required for operation of each component under control of the processor 270. In particular, the power supply unit 290 may be supplied with power inside the vehicle 100.

Figure 9:
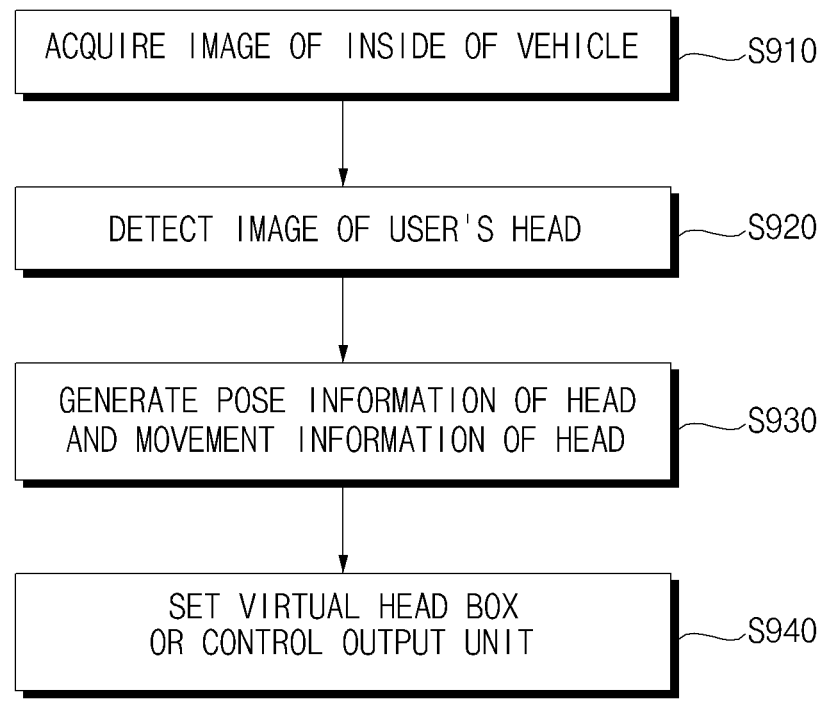
FIG. 9 is a flowchart illustrating operation of a user interface apparatus for a vehicle according to an embodiment of the present invention.

FIG. 9 is a flowchart illustrating operation of a user interface apparatus for a vehicle according to an embodiment of the present invention.

Referring to FIG. 9, the processor 270 may acquire an image of the inside of the vehicle 100 through the internal camera 220 in S910.

The processor 270 may detect an image of a user's head based on the image of the inside of the vehicle 100 in S920.

The processor 270 may generate pose information of the user's head and movement information of the user's head based on the image of the user's head in S930.

The processor 270 may set a virtual head box based on the pose information of the user's head and the movement information of the user's head in S940.

In another example, the processor 270 may control the output unit 250 based on the pose information of the user head and the movement information of the user's head in S940.

Figure 10B:
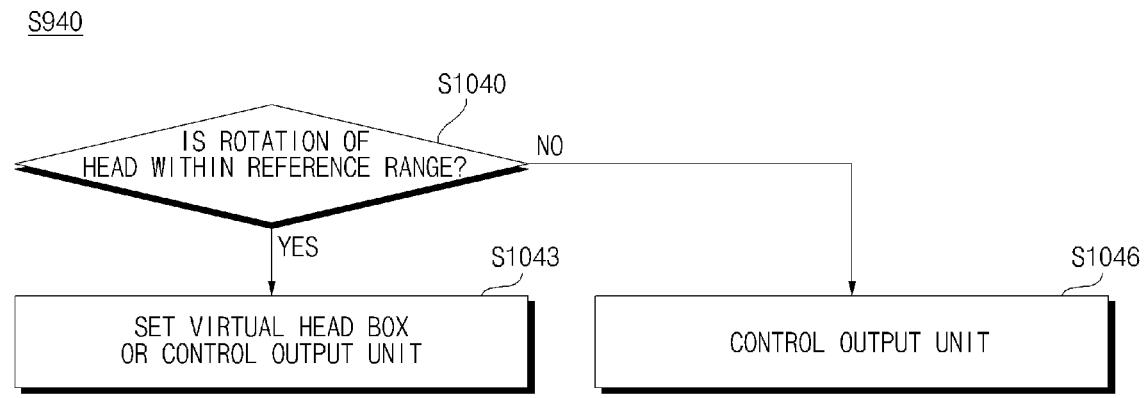
Figure 10C:
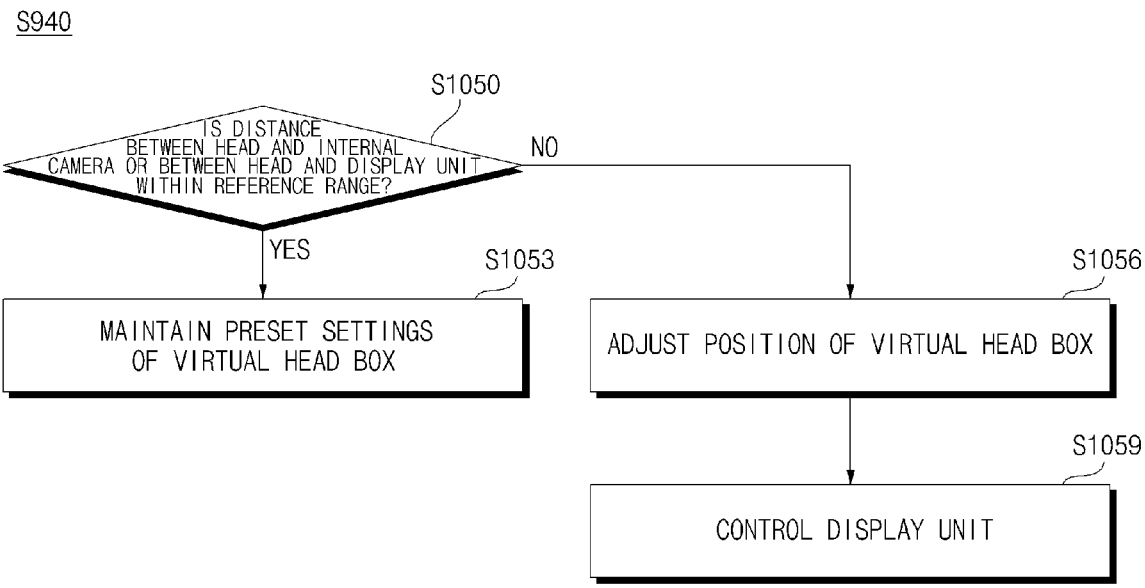

FIGS. 10A to 10C are flowcharts showing detailed operations of a user interface apparatus for a vehicle according to an embodiment of the present invention.

FIG. 10A to FIG. 10C show examples of details of the operation S940 shown in FIG. 9.

Referring to FIG. 10A, the processor 270 may determine whether an image of the user's head is positioned in the first region or the second region in an image of the inside of the vehicle 100 in S1010.

When it is determined that the image of the user's head is positioned in the first region, the processor 270 may determine whether movement of the user's head is within a reference range in the first region in S1020.

When it is determined that movement of the user's head is within the reference range in the first region, the processor 270 may maintain preset settings of the virtual head box in S1023.

When it is determined that movement of the user's head is beyond the reference range in the first region, the processor 270 may adjust the preset position of the virtual head box based on the movement information of the user's head in S1025.

Next, the processor 270 may control the display unit 251 based on the adjusted position of the virtual head box in S1027.

For example, the processor 270 may adjust barrier areas and light transmission areas of the filter unit based on the adjusted position of the virtual head box.

For example, the processor 270 may adjust the position of a multi-view image, output from the image output unit, in a horizontal direction based on the adjusted position of the virtual head box.

When it is determined in S1010 that the image of the user's head is in the second region, the processor 270 may determine that movement of the user's head is within the reference range in the second region in S1030.

When it is determined that movement of the user's head is within the reference range in the second region, the processor 270 may maintain preset settings of the virtual head box in S1023.

When it is determined that movement of the user's head is beyond the reference range in the second region, the processor 270 may adjust the preset size of the virtual head box in S1035.

Next, the processor 270 may control the display unit 251 based on the adjusted size of the virtual head box in S1037.

For example, the processor 270 may adjust the size of the barrier areas and the light transmission areas of the filter unit based on the adjusted size of the virtual head box.

For example, the processor 270 may adjust a period of each barrier area or each light transmission area of the filter unit based on the adjusted size of the virtual head box.

For example, the processor 270 may adjust an alternating period of a multi-view image, output from the image output unit, based on the adjusted size of the virtual head box.

Referring to FIG. 10B, the processor 270 may determine whether rotation of a user's head is within a reference range in S1040.

When it is determined that the rotation of the user's head is within the reference range, the processor 270 may maintain preset settings of the virtual head box in S1043.

When it is determined that the rotation of the user's head is beyond the reference range, the processor 270 may control the output unit 250 in S1046.

For example, when it is determined that rotation of the user's head is beyond the reference range, the processor 270 may control the display unit 251 to convert stereoscopic image into flat content.

For example, when it is determined that the rotation of the user's head is beyond the reference range, the processor 270 may output alarm through at least one of the display unit 251, the sound output unit 252, and the haptic output unit 253. By doing so, it is possible to induce a user to look forward.

Referring to FIG. 10C, the processor 270 may determine whether a distance between a user's head and the display unit 251 is within a reference range in S1050.

Alternatively, the processor 270 may determine whether a distance between the user's head and the internal camera 220 is within the reference range in S1050.

When it is determined that the distance is within the reference range, the processor 270 may maintain preset settings of the virtual head box in S1053.

When it is determined that the distance between a user's head and the display unit 251 is beyond the reference range, the processor 270 may adjust the position of the virtual head box based on information about the distance in S1056.

Next, the processor 270 may control the display unit 251 based on the information about the distance between a user's head and the display unit 251 in S1059.

For example, the processor 270 may adjust the size of the barrier areas and the light transmission areas of the filter unit based on an adjusted size of the virtual head box.

For example, the processor 270 may adjust a period of each barrier area or each light transmission area of the filter unit based on an adjusted size of the virtual head box.

For example, the processor 270 may adjust an alternating period of a multi-view image, output from the image output unit, based on an adjusted size of the virtual head box.

Figure 11:
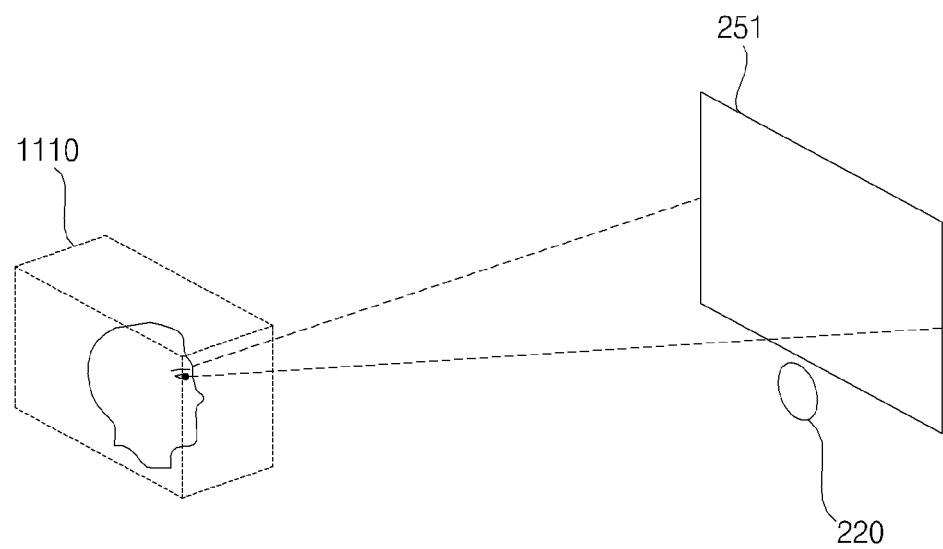
FIG. 11 is a conceptual diagram for explanation of a virtual head box according to an embodiment of the present invention.

FIG. 11 is a conceptual diagram illustrating a virtual head box according to an embodiment of the present invention.

Referring to FIG. 11, the processor 270 may set a virtual head box 1110.

The virtual head box 1110 may be set to be a three dimensional shape having volume.

For example, the virtual head box 1110 may be in a hexagonal, sphere, cylindrical, square, truncated cone, or polygonal shape.

If the user's head is positioned inside the virtual head box 1110, the user may see valid stereoscopic content on the display unit 251 with bare eyes.

The valid stereoscopic content is implemented three-dimensionally so that the user recognizes it as 3D content.

If the user's head is out of the virtual head box 1110, the user is not able to see the valid stereoscopic content on the display unit 251 with bare eyes. In this case, non-3D content or content in a distorted shape may be seen by the user.

The processor 270 may adjust settings of the virtual head box 1110.

For example, the processor 270 may change the position of the virtual head box 1110.

For example, the processor 270 may change the size of the virtual head box 1110.

The processor 270 may control the display unit 251 in response to a change in settings of the virtual head box 1110.

For example, the processor 270 may control the image output unit in response to a change in settings of the virtual head box 1110.

For example, the processor 270 may control the filter unit in response to a change in settings of the virtual head box 1110.

Figure 12A:
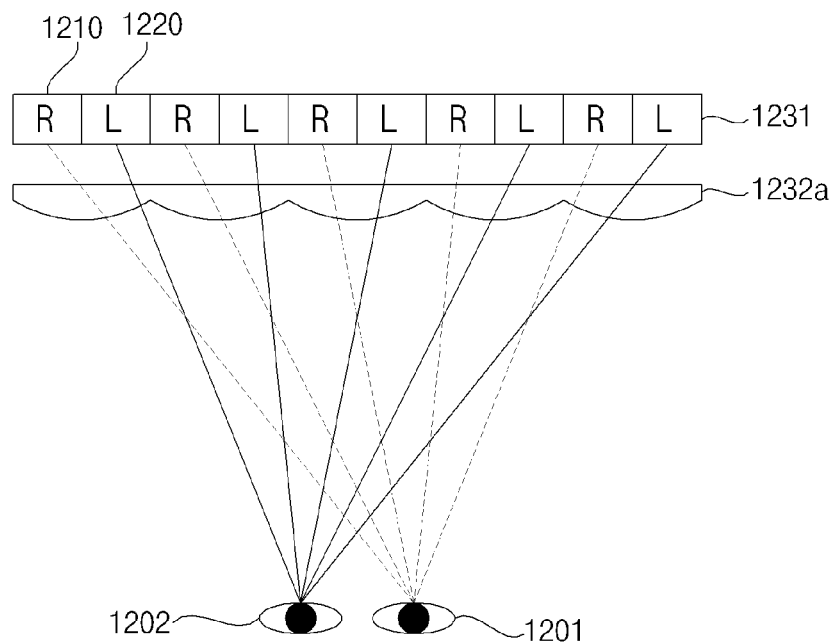
FIGS. 12A to 13 are diagrams for explanation of a display unit according to an embodiment of the present invention.
Figure 12B:
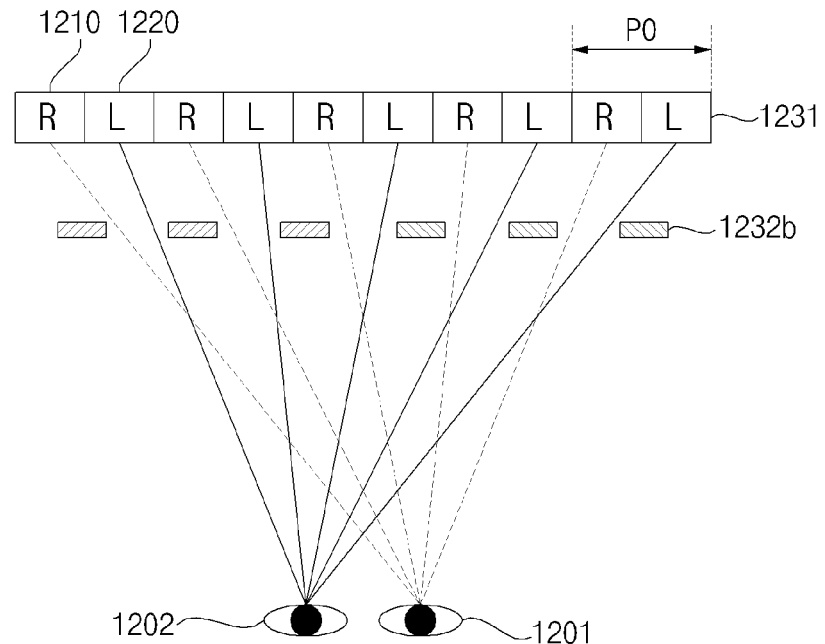
Figure 13:
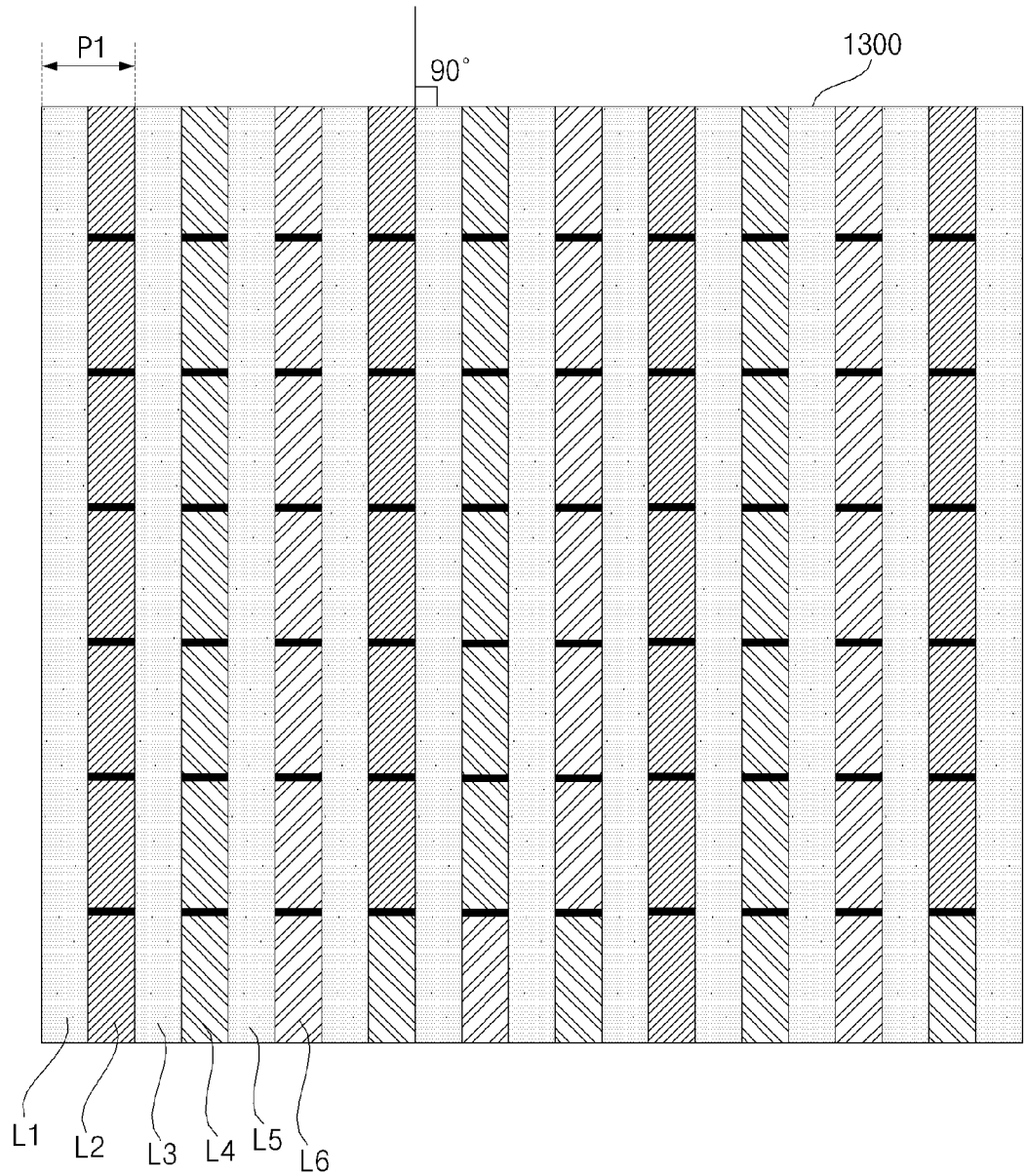

FIGS. 12 and 13 are diagrams for explanation of a display unit according to an embodiment of the present invention.

FIG. 12 is a diagram for explanation of a principle of how a display unit outputs stereoscopic content.

The display unit 251 may include an image output unit 1231 and a filter unit 1232.

The image output unit 1231 may include a plasma display panel (PDP), a liquid crystal display (LCD), an organic light emitting display (OLED), and a flexible display.

The image output unit 1231 may output an image based on an image signal, a data signal, an OSD signal, and a control signal processed by the processor 270.

The processor 270 may adjust an alternating period of a multi-view image output from the image output unit 1231.

The processor 270 may adjust the position of the multi-view image, output from the image output unit 1231, in a horizontal direction.

The filter unit 1232 may vary a direction of travel of light according to an applied voltage.

A first voltage may be applied to the first region of the filter unit, which corresponds to an 2D image region of the image output unit 1231, so light may be emitted in the same direction as light emitted from the 2D image region of the image output unit 1231. As a result, a user may perceive a displayed image as a 2D image.

In another example, the image output unit 1231 may apply a second voltage to a second region of the filter unit, which corresponds to a 3D image region of the image output unit 1231, so light emitted from the 3D image region is scattered and thus scattered light is produced. As a result, it causes a 3D effect, allowing a user to perceive the displayed 3D image as a stereoscopic image without the need of wearing 3D glasses.

Meanwhile, the filter unit 1232 may vary the positions of the light transmission areas according to an applied voltage to correspond to a multi-view image displayed during a first frame display period. Accordingly, the filter unit 1232 may pass through a first region in a display area of the multi-view image during a first sub-frame duration within a first frame duration, while passing through a second region in the display area of the multi-view image during a second sub-frame duration within the first frame duration.

As describe above, the display unit 251 may be implemented in a lenticular method or a parallax method, and may be further implemented using a microlens array. Hereinafter, the lenticular method and the parallax method will be described in details. In addition, although the following description is about an example in which a multi-view image consists of a left-eye image and a right-eye image, it is merely exemplary for convenience of explanation, and aspects of the present invention are not limited thereto.

FIG. 12A is a diagram illustrating a lenticular method in which a lenticular lens is employed. Referring to FIG. 12A, blocks 1220 L forming a left-eye image and blocks 1210 R forming a right-eye image may be alternatively arranged on the image output unit 1231. In this case, each block may include a plurality of pixels or a single pixel. Hereinafter, the case where each block is composed of a single pixel is mainly described.

In the lenticular method, a lenticular lens 1232a is placed in the filter unit 1232. Placed in front of the image output unit 1231, the lenticular lens 1232a may vary a direction of travel of light emitted from the pixels 1210 and 1220.

For example, the lenticular lens 1232a may vary a direction of travel of light emitted from the pixels 1220 L forming the left-eye image toward the left eye 1202, while varying a direction of travel of light emitted from the pixels 1210 R forming the right-eye image toward the user's right eye 1201.

Accordingly, the left eye 1202 of the user sees the left-eye image as light emitted from the pixels 1220 L forming the left-eye image are gathered, and the right eye 1201 of the user sees the right-eye image which is formed as lights emitted from the pixels 1210 R forming the right-eye image are gathered. As a result, the user is able to perceive a stereoscopic image without the need of wearing additional glasses.

FIG. 12B is a diagram illustrating a parallax method in which slit arrays are employed. Referring to FIG. 12B, pixels 1220 L forming a left-eye image and pixels 1210 R forming a right-eye image may be alternatively arranged in the image output unit 1231 in the same way illustrated in FIG. 12A.

In addition, in the parallax method, slit arrays 1232b are placed in the filter unit 1232, and the slit arrays 1232b act as barriers to allow light, emitted from the pixels, to travel in constant directions.

Accordingly, similarly to the lenticular method, the left eye 1202 of the user sees the left-eye image and the right eye 1201 of the user sees the right-eye image. As a result, the user is able to perceive a stereoscopic image without the need of wearing additional glasses.

In the parallax method, the filter unit 1232 may be implemented as liquid crystals. In this case, the filter unit 1232 may form barrier areas and light transmission areas under control of the processor 270.

The processor 270 may adjust the size and positions of the barrier areas and the light transmission areas, or adjust a period of each barrier area.

FIG. 12B shows an example in which a period of a left-eye image and a right-eye image is P0.

FIG. 13 is a diagram illustrating a filter unit of a glass-free method.

First, FIG. 13 shows an example of a filter unit 1232 of a vertical parallax barrier method.

According to the vertical parallax barrier method shown in FIG. 13, barrier areas L1, L3, and L5, and light transmission areas L2, L4, and L6 are arranged in a vertical direction. In addition, the barrier areas L1, L3, and L5, and the light transmission areas L2, L4, and L6 are alternatively arranged. FIG. 13 shows an example in which a period for a barrier area is P1.

FIGS. 14 to 18 are diagrams for explanation of a user interface apparatus for a vehicle according to an embodiment of the present invention.

Figure 14:
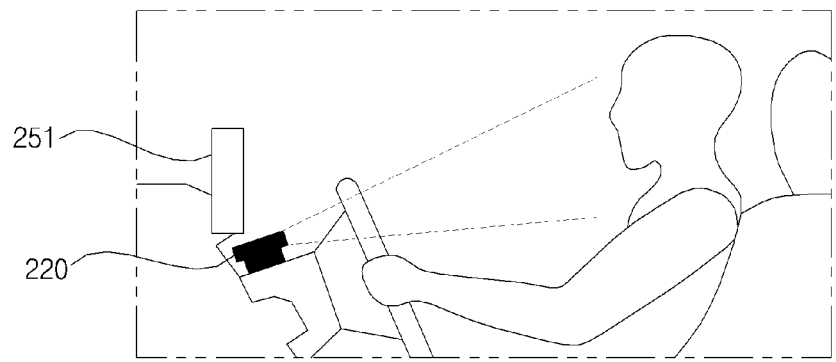
FIGS. 14 to 18 are diagrams for explanation of a user interface apparatus for a vehicle according to an embodiment of the present invention.
Figure 14:
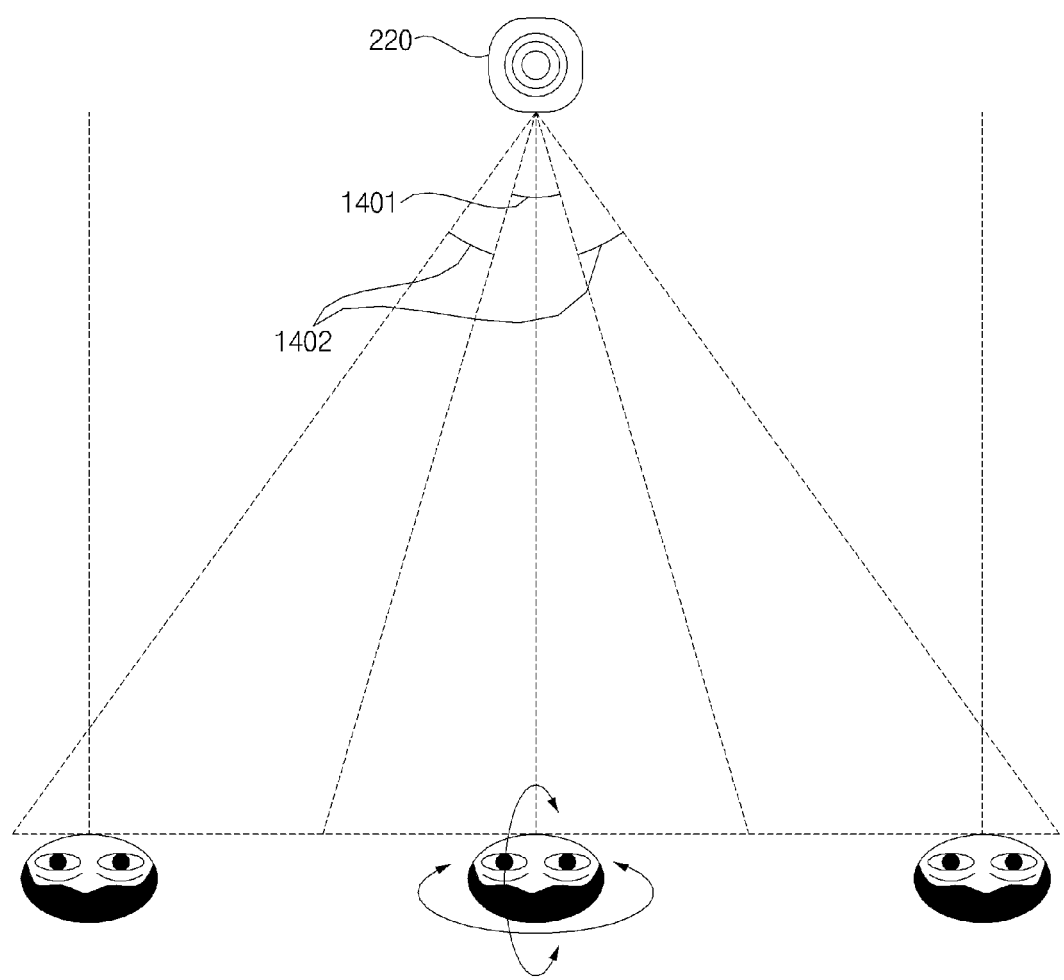

Referring to FIG. 14, the display unit 251 may be placed in front of a user. For example, the display unit 251 may be disposed in one region of a cockpit module. For example, the display unit 251 may be disposed on a dashboard.

The internal camera 220 may be disposed around the display unit 251. For example, the internal camera 220 may be disposed above, under, on the left side, or on the right side of the display unit 251.

The internal camera 220 may include a plurality of cameras. The plurality of cameras may be disposed at different locations around the display unit 251.

A camera included in the internal camera 220 may have a horizontal viewing angle and a vertical viewing angle.

The processor 270 may divide an image of the inside of the vehicle 100 into a first region and a second region based on a viewing angle of a camera included in the internal camera 220.

For example, the processor 270 may set a region in an image of the inside of the vehicle 100, which corresponds to a first viewing angle range 1401 of a camera, as the first region. The first viewing angle range 1401 may include the horizontal viewing angle range and the vertical viewing angle range.

For example, the processor 270 may set a region in an image of the inside of the vehicle 100, which corresponds to a second viewing angle range 1402 of the camera, as a second region. The second viewing angle range 1402 may include a horizontal viewing angle range and a vertical viewing angle range.

Figure 15:
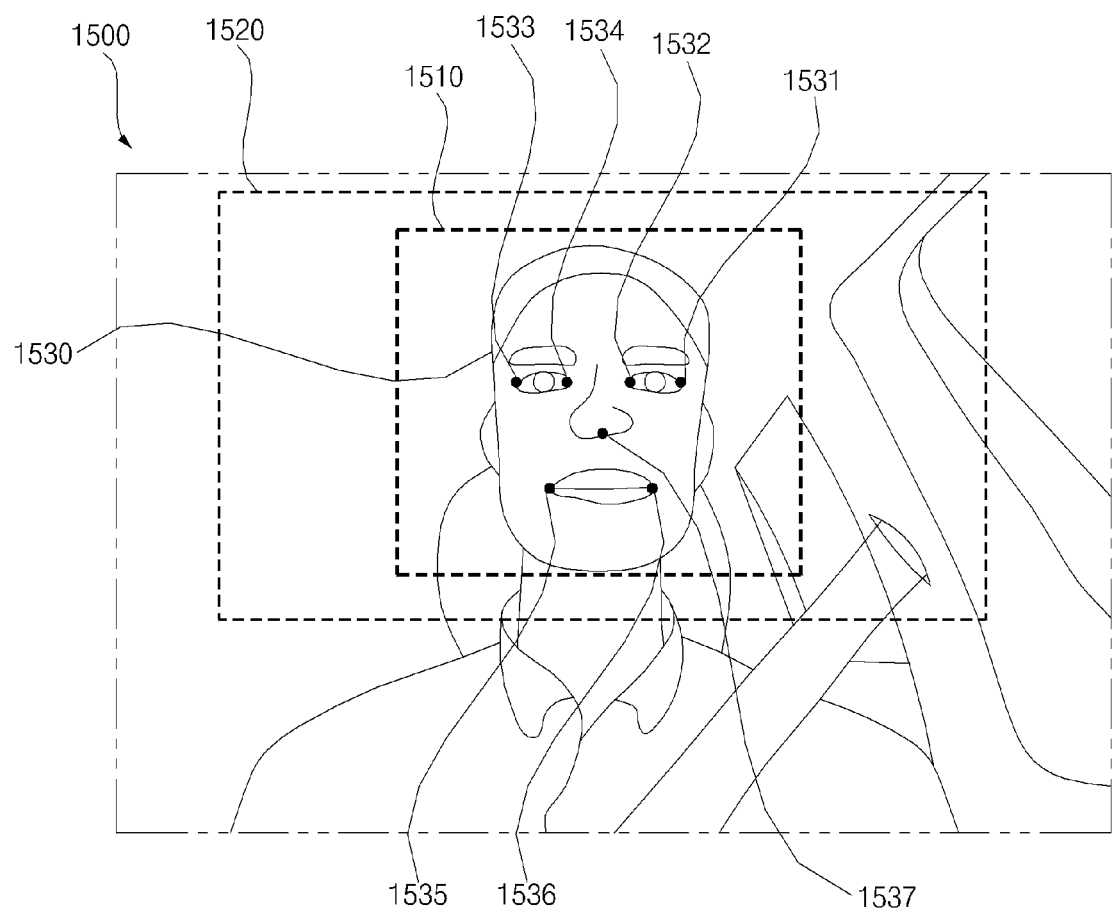
Figure 16A:
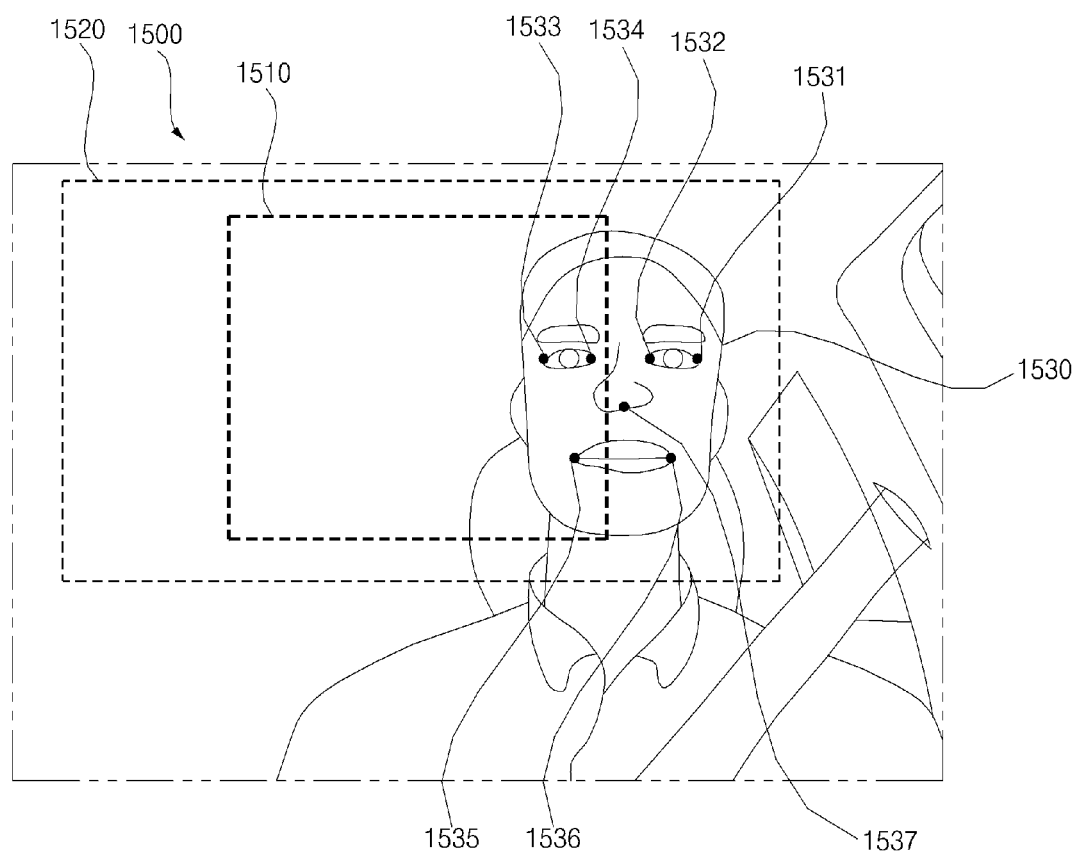
Figure 16B:
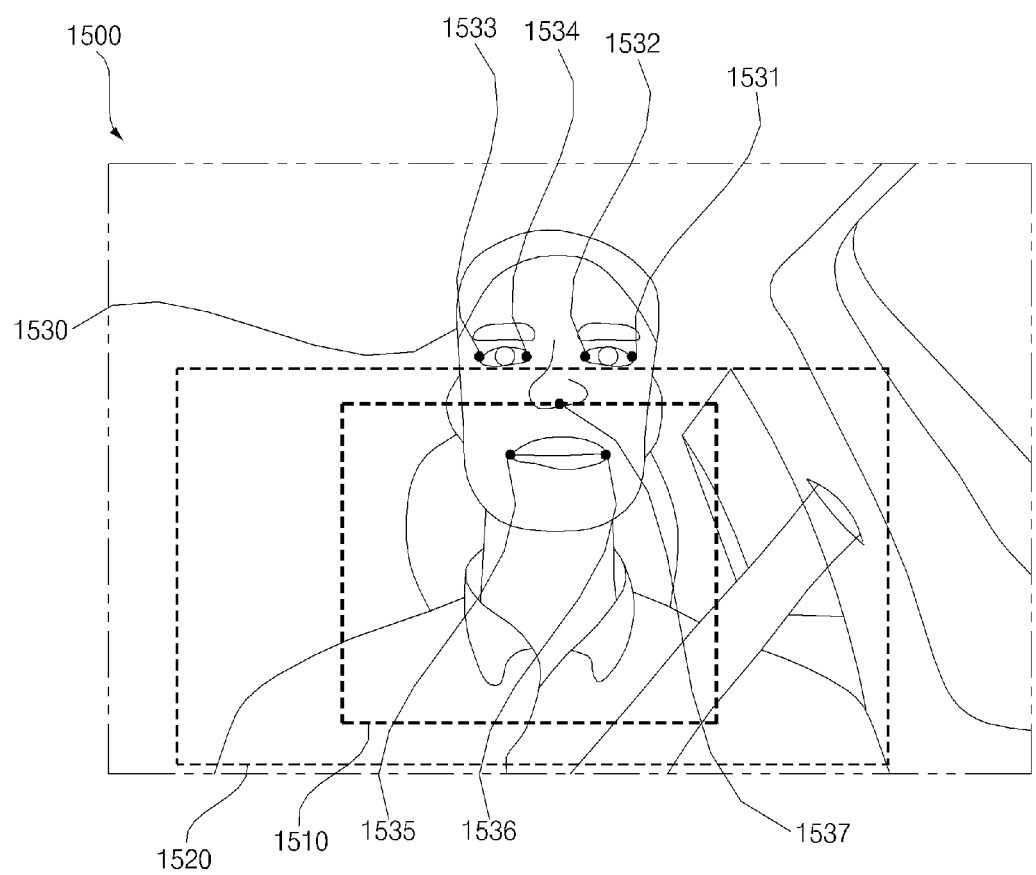

FIGS. 15 to 16B are diagrams illustrating an exemplary image of the inside of a vehicle acquired by the internal camera 220.

Referring to FIGS. 15 to 16B, an image 1500 of the inside of the vehicle 100 may be divided into a first region 1510 and a second region 1520.

The first region 1510 may be formed relatively at the center of the image 1500, compared to the second region 1520.

The second region 1520 may be formed in an outer side of the image 1500 as compared to the first region 1510.

The processor 270 may detect an image 1530 of a user's head based on the image 1500.

Based on the image 1500, the processor 270 may detect a feature point 1531, 1532, 1533, 1534, 1535, 1536, or 1537 which may define the user's head.

A feature point may include a first point 1531 of a left eye of the user, a second point 1532 of the left eye of the user, a first point 1533 of a right eye of the user, a second point 1534 of the right eye of the user, a first point 1535 of the lips of the user, a second point 1536 of the lips of the user, and a first point 1537 of a nose of the user.

As illustrated in FIG. 15, the processor 270 may determine whether the image 1530 is located in the first region 1510.

For example, the processor 270 may determine whether the image 1530 is located in the first region 1510, by determining whether the feature point 1531, 1532, 1534, 1535, 1536, or 1537 is located in the first region 1510.

When it is determined that the image 1530 is located in the first region 1510, the processor 270 may determine whether movement of the user's head is within a reference range in the first region 1510.

For example, the processor 270 may determine whether the movement of the user's head is within a reference range in the first region 1510, by determining whether the mean and standard deviation of locations of a feature point 1531, 1532, 1533, 1534, 1535, 1536, or 1537 is within the reference range in a plurality of frames.

When it is determined that the movement of the user's head is within the reference range in the first region 1510, the processor 270 may maintain settings of a virtual head box.

When it is determined that the movement of the user's head is beyond the reference range, the processor 270 may adjust a preset position of the virtual head box based on the mean or standard deviation of locations of the feature point 1531, 1532, 1533, 1534, 1535, 1536, or 1537.

In response to the movement of the user's head, the processor 270 may change the position of the virtual head box.

For example, when the user's head moves to the right in a forward driving direction of the vehicle 100, the processor 270 may move the virtual head box to the right in the forward direction of the vehicle 100 in proportion to a distance which the user's head has moved.

For example, when the user's head moves to the left in a forward driving direction of the vehicle 100, the processor 270 may move the virtual head box to the left in the forward driving direction of the vehicle 100 in proportion to a distance which the user's head has moved.

For example, when the user's head moves upward, the processor 270 may move the virtual head box upward in proportion to a distance which the user's head has moved.

For example, when the user's head moves downward, the processor 270 may move the virtual head box downward in proportion to a distance which the user's head has moved.

The processor 270 may control the display unit 251 based on the changed position of the virtual head box.

In response to the changed position of the virtual head box, the processor 270 may adjust the positions of the barrier areas and the light transmission areas of the filter unit.

In response to the changed position of the virtual head box, the processor 270 may adjust a position of a multi-view image output from the image output unit.

As illustrated in FIGS. 16A to 16B, the processor 270 may determine whether an image 1530 of a user's head is located in a second region 1520.

For example, the processor 270 may determine whether the image 1530 is located in the second region 1520, by determining whether a feature point 1531, 1532, 1533, 1534, 1535, 1536, or 1537 is located in the second region 1520.

When it is determined that the image 1530 is located in the second region 1520, the processor 270 may determine whether movement of the user's head is within a reference range in the second region 1520.

For example, the processor 270 may determine whether the movement of the user's head is within a reference range, by determining whether the mean and standard deviation of locations of the feature point 1531, 1532, 1533, 1534, 1535, 1536, or 1537 are within the reference range.

When it is determined that the movement of the user's head is within the reference range, the processor 270 may maintain settings of a virtual head box.

When it is determined that the movement of the user's head is beyond the reference range, the processor 270 may adjust the preset size of the virtual head box based on the mean or standard deviation of locations the a feature point 1531, 1532, 1533, 1534, 1535, 1536, or 1537.

For example, the processor 270 may adjust the preset size of the virtual head box by extending the virtual head box in an overall width direction or in an overall height direction.

The processor 270 may control the display unit 251 based on the changed position of the virtual head box.

For example, the processor 270 may adjust the size of the barrier areas and the light transmission areas of the filter unit based on the adjusted size of the virtual head box.

For example, the processor 270 may adjust a period of each barrier area or each light transmission area based on the adjusted size of the virtual head box.

For example, the processor 270 may adjust an alternating period of a multi-view image, output from the image output unit, based on the adjusted size of the virtual head box.

Figure 17:
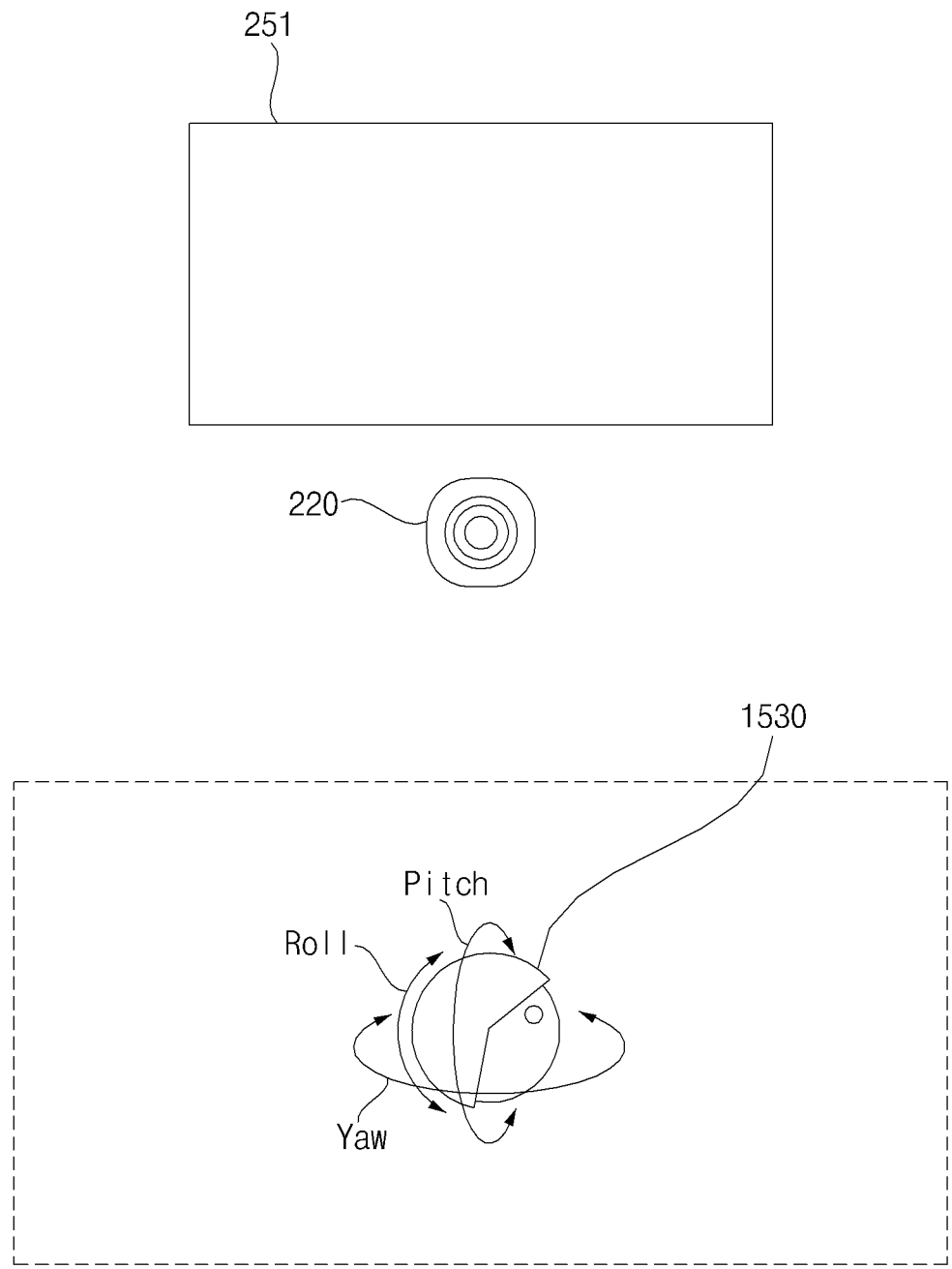

FIG. 17 shows an example of a user, an internal camera, and a display unit as seen in a forward direction from the back seat.

Referring to FIG. 17, the processor 270 may generate information on rotation of the user's head.

The processor 270 may determine whether the rotation of the user's head is within a reference range.

The rotation of the user's head may be classified as yaw, roll, or pitch.

Yaw may be defined as rotation in an overall width direction.

Roll may be defined as rotation in an overall length direction.

Pitch may be defined as rotation in an overall height direction.

The processor 270 may determine whether rotation of the user's head is within the reference range.

The processor 270 may determine whether rotation of the user's head in the overall width direction is within the reference range.

The processor 270 may determine whether rotation of the user's head in the overall length direction is within the reference range.

The processor 270 may determine whether rotation of the user's head in the overall height direction is within the reference range.

When it is determined that rotation of the user's head is within the reference range, the processor 270 may maintain settings of the virtual head box.

When it is determined that rotation of the user's head is beyond the reference range, the processor 270 may control the display unit 251 so as to convert stereoscopic content into flat content.

Figure 18:
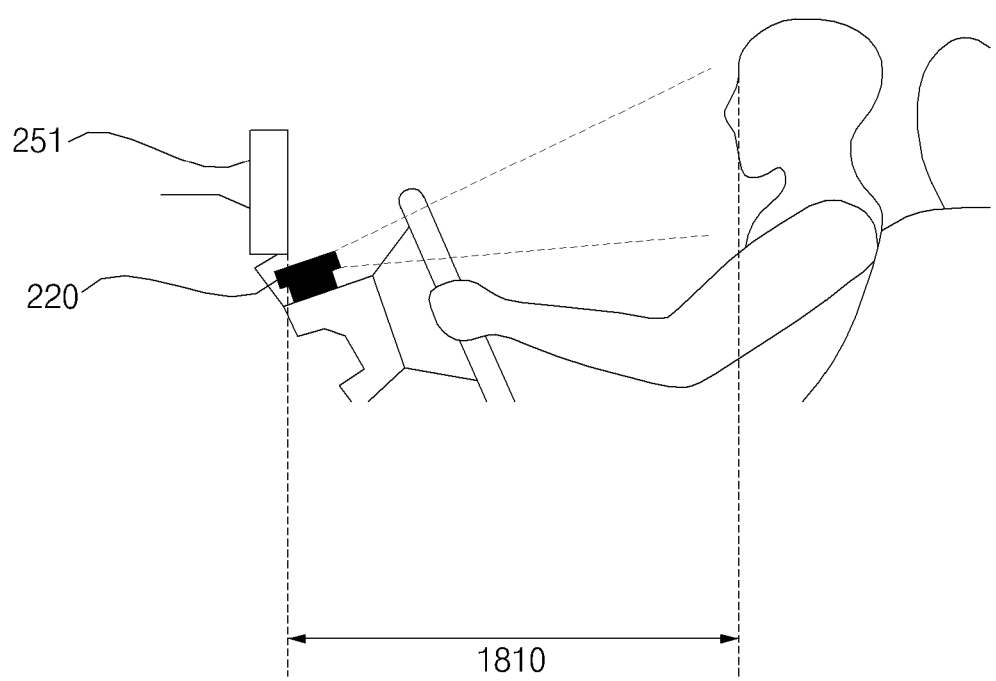

FIG. 18 shows an example of a user, an internal camera, and a display unit as seen from the side.

Referring to FIG. 18, the internal camera 220 may include a stereo camera.

The processor 270 may acquire a stereo image through a stereo camera.

The processor 270 may acquire information on a distance between the stereo camera and an object, based on disparity of an object detected from an stereo image.

The processor 270 may acquire information 1810 about a distance between the display unit 251 and an object, by correcting information on a distance between the display unit 251 and the stereo camera based on the information on the distance between the stereo camera and the object.

The object may be the user's head, face, or eye.

The processor 270 may acquire information on a distance between the display unit 251 and the user's head.

The processor 270 may acquire information on a distance between the display unit 251 and the user's eye.

The processor 270 may determine whether a distance between the display unit 251 and the user's head or between the display unit 251 and the user's eye is within a reference range.

When it is determined that the distance is within the reference range, the processor 270 may maintain settings of the virtual head box.

When it is determined that the distance is beyond the reference range, the processor 270 may adjust settings of the virtual head box.

When it is determined that the distance is beyond the reference range, the processor 270 may control the display unit 251.

When it is determined that the distance is beyond the reference range, the processor 270 may control the filter unit.

When it is determined that the distance is beyond the reference range, the processor 270 may control the image output unit.

FIGS. 19A to 19E are diagrams for explanation of verifying settings of a virtual head box according to an embodiment of the present invention.

Verification of settings of a virtual head box may be performed when the user interface apparatus 200 is manufactured, when the user interface apparatus 100 is mounted in the vehicle 100, before or when a user uses the vehicle 100, or when the user of the vehicle 100 is changed.

Meanwhile, the display unit 251 provided in the vehicle 100 is smaller than a TV and has resolution similar to that of the TV. Accordingly, pixels of the display unit 251 provided in the vehicle 100 are arranged closely, compared to the TV. In this case, more sophisticated control is required to implement stereoscopic content, compared to using the TV.

That is, when the user moves even a little bit, the user may not be able to perceive valid stereoscopic content displayed on the display unit 251 of the vehicle 100. Thus, it is necessary to verify settings of the virtual head box in the following procedure.

Figure 19A:
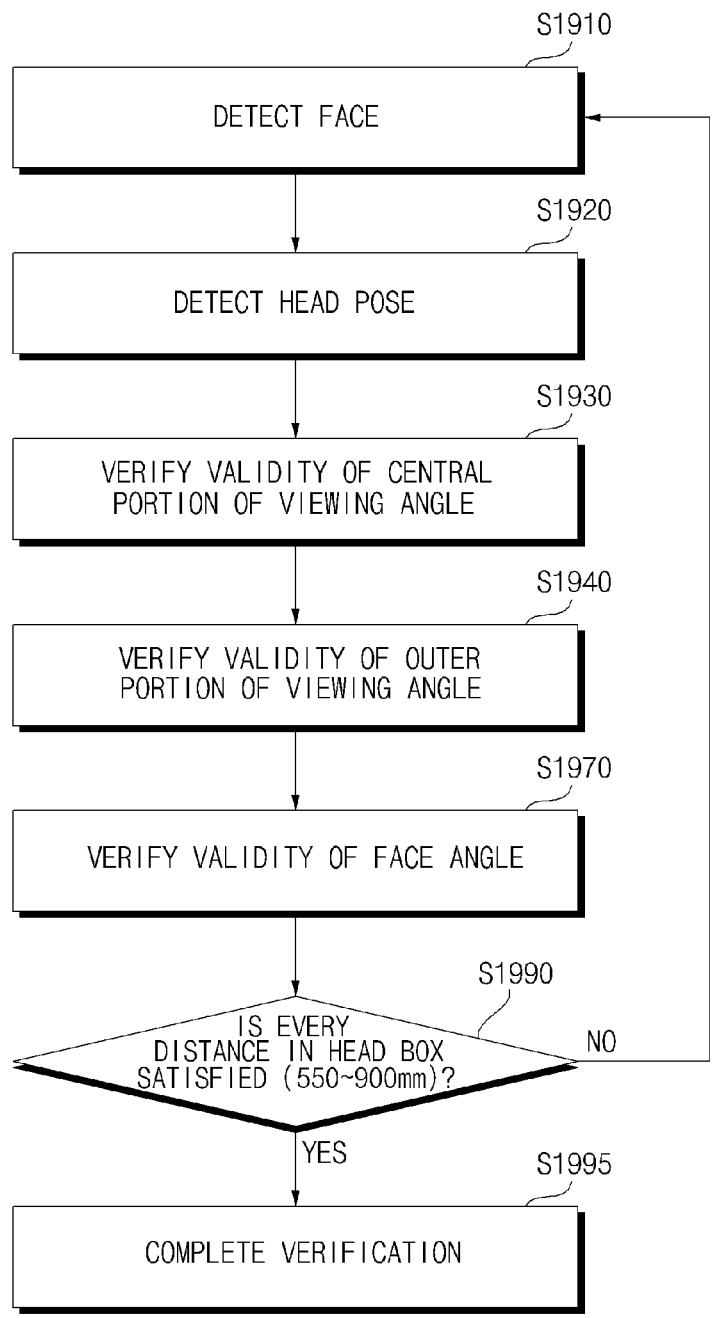
FIGS. 19A to 19E are diagrams for explanation of a process for verifying settings of a virtual head box according to an embodiment of the present invention.

FIG. 19A is a diagram for explanation of the overall operation of verifying settings of a virtual head box according to an embodiment of the present invention.

Referring to FIG. 19A, when a virtual head box is preset, the processor 270 may detect a user's head based on an image of the inside of the vehicle 100 in S1910.

For example, the processor 270 may detect the user's entire face outline, and detect the user's face by comparing the detected face outline with data stored in the memory 240.

For example, the processor 270 may detect a feature point corresponding to at least one of an eye, a nose, lips, and an ear, and detect the user's face based on the detected feature point.

The processor 270 may detect a pose of the user's head in S1920.

For example, the processor 270 may detect a pose of the user's head based on a pose of the user's entire face outline.

For example, the processor 270 may detect a pose of the user's head based on a feature point corresponding to at least one of an eye, a nose, lips, and an ear.

The processor 270 may verify validity of the central portion of a viewing angle in S1930.

The central portion of the viewing angle may be the aforementioned first region.

Details of the operation S1930 will be described with reference to FIG. 19B.

The processor 270 may verify validity of the outer portion of the viewing angle in S1940.

The outer portion of the viewing angle may be the aforementioned second region.

Details of the operation S1940 will be described with reference to FIGS. 19C and 19D.

The processor 270 may verify validity of a face angle.

The face angle may correspond to the aforementioned rotation of the user's head in S1970.

Details of the operation S1970 will be described with reference to FIG. 19E.

The processor 270 may determine whether conditions of the operations S1930, S1940, and S1970 are satisfied within a reference distance range in S1990.

The distance may be a distance between the user's head and the internal camera 220 or a distance between the user's face and the display unit 251.

For example, the reference distance range may be a range of between 550 mm and 990 mm.

If it is determined that conditions of the operations S1930, S1940, and S1970 are satisfied within the reference distance range, the processor 270 may complete verification of the virtual head box in S1995.

FIG. 19B to FIG. 19E are diagrams for explanation of detailed operations for verifying settings of a virtual head box according to an embodiment of the present invention.

Figure 19B:
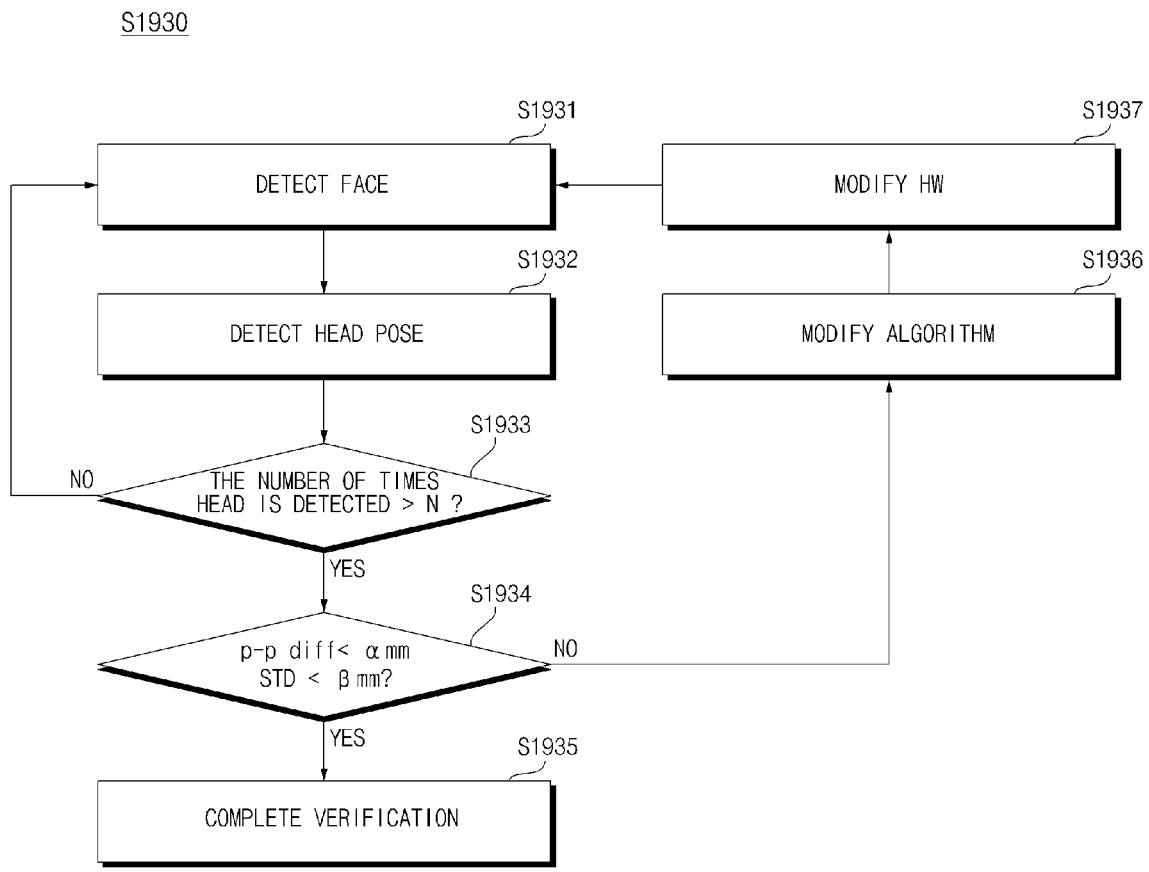

Referring to FIG. 19B, when a virtual head box is preset, the processor 270 may detect a user's face based on an image of the inside of the vehicle 100 in S1931.

For example, the processor 270 may detect the user's entire face outline, and detect the user's face by comparing the detected face line with data stored in the memory 240.

For example, the processor 270 may detect a feature point corresponding to at least one of an eye, a nose, lips, and an ear, and detect the user's face based on the detected feature point.

The processor 270 may detect a pose of the user's head in S1932.

For example, the processor 270 may detect a pose of the user's head based on a pose of the user's entire face outline.

For example, the processor 270 may detect a pose of the user's head based on a feature point corresponding to at least one of an eye, a nose, lips, and an ear.

The processor 270 may count the number of times the user's face is detected, and determines whether the counted number of times is greater than a preset value in S1933.

When the counted number of times is greater than the preset value, the processor 270 may perform operation S1934.

When the counted number of times is not greater than the preset value, the processor 270 may return to the operation S1931.

In some embodiments, the operation S1933 may be omitted.

The processor 270 may determine whether a feature point variation difference (p-p diff) is smaller than a reference value in S1934. The feature point variation difference may be defined as a value obtained by calculating difference between two locations with the greatest variation among locations of a feature point which is tracked over a plurality of frames during a unit time.

The processor 270 may determine whether the standard deviation (STD) of variation of the feature point is smaller than a reference value in S1934. The standard deviation may be defined as a value obtained by calculating the standard deviation of locations of a feature point which is tracked over a plurality of frames during a unit time.

If the conditions of the operation S1934 are satisfied, the processor 270 may complete verification in S1935.

If any one of the conditions of the operation S1934 is not satisfied, the processor 270 may modify an algorithm and hardware in S1936 and S1937.

Modifying an algorithm may be adjusting at least one of a face detection algorithm, a feature detection algorithm, and a head pose detection algorithm.

Modifying hardware may be adjusting any one of exposure time setting of a camera included in the internal camera 220, setting of in-vehicle illumination, and blocking external light.

The processor 270 may provide a control signal to modify hardware to a different device included in the vehicle 100 through the interface unit 245.

Figure 19C:
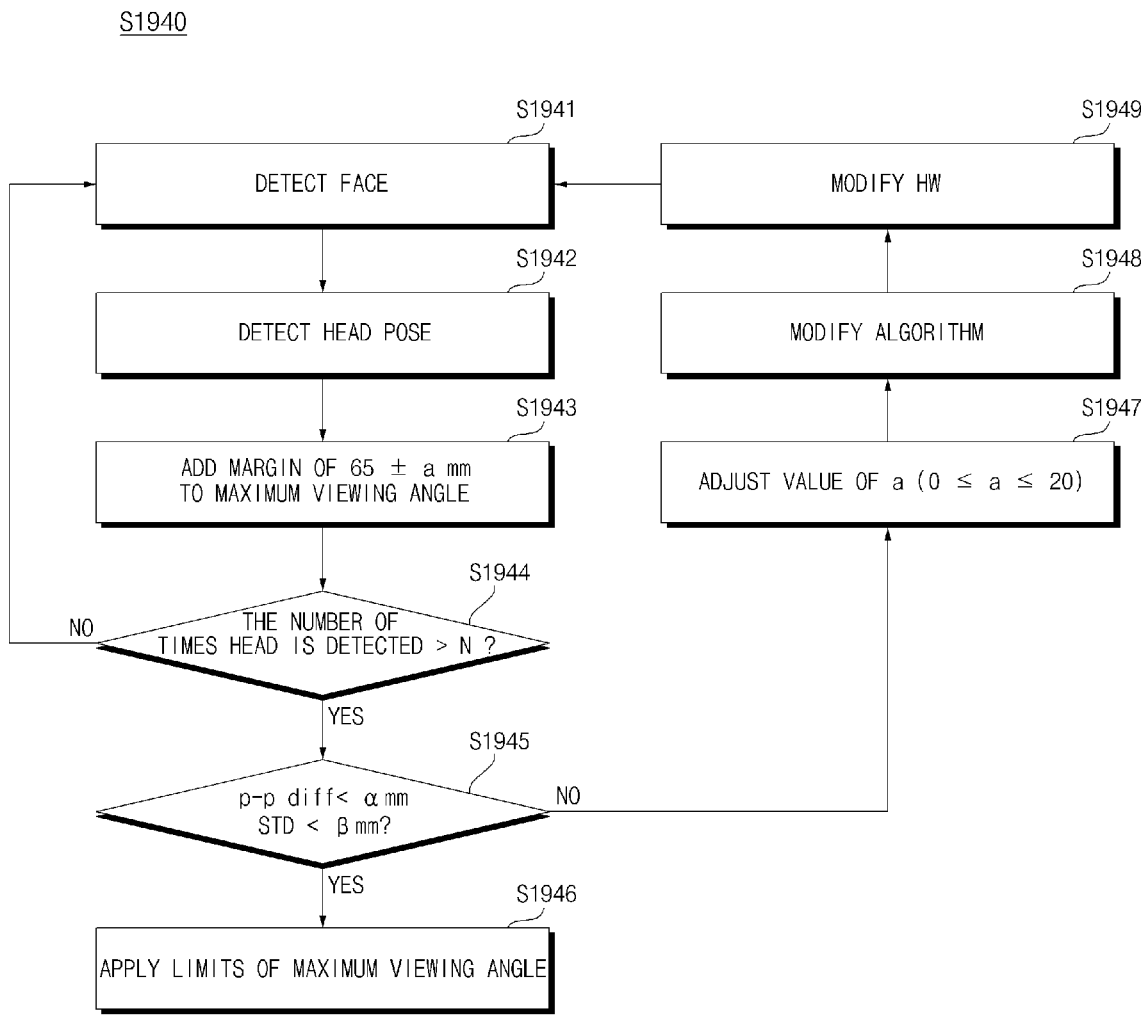

Referring to FIG. 19C, the processor 270 may utilize part of an image of the inside of the vehicle 100 to detect a user's face, the image which is acquired using a viewing angle of a camera included in the internal camera 220.

For example, if a viewing angle of the camera is 40 degrees, the processor 270 may utilize an image of the inside of the vehicle 100 to detect a user's face, the image which corresponds to 30 degree.

For provision of valid stereoscopic content, the both eyes of the user should be detected. To this end, a margin should be set on both sides of the camera in a horizontal direction (for example, an overall width direction).

FIG. 19C is a diagram for explanation of an operation of setting a margin in a horizontal direction (for example, an overall width direction).

When a virtual head box is preset, the processor 270 may detect a user's face based on an image of the inside of the vehicle 100 in S1941.

For example, the processor 270 may detect the user's entire face outline, and detect the user's face by comparing the detected face line with data stored in the memory 240.

For example, the processor 270 may detect a feature point corresponding to at least one of an eye, a nose, lips, and an ear, and detect the user's face based on the detected feature point.

The processor 270 may detect a pose of the user's head in S1942.

For example, the processor 270 may detect a pose of the user's head based on a pose of the user's entire face outline.

For example, the processor 270 may detect a pose of the user's head based on a feature point corresponding to at least one of an eye, a nose, lips, and an ear.

The processor 270 may set a margin of a preset value on both sides of the maximum viewing angle of the camera in a horizontal direction in S1943.

For example, the processor 270 may set a margin of 65±a mm on both sides of the camera in the horizontal direction.

The processor 270 may count the number of times the user's face is detected, and determine whether the counted number of times is greater than a preset value in S1944.

If the counted number of times is greater than the preset value, the processor 270 may perform operation S1945.

If the counted number of times is not greater than the preset value, the processor 270 may return to the operation S1941.

In some embodiments, the operation S1944 may be omitted.

The processor 270 may determine whether a feature point variation difference (p-p diff) is smaller than a reference value in S1945. The feature point variation difference may be defined as a value obtained by calculating difference between two locations with the greatest variation among locations of a feature point which is tracked over a plurality of frames during a unit time.

The processor 270 may determine whether the standard deviation STD of variation of the feature point is smaller than the reference value in S1945. The standard deviation may be defined as a value obtained by calculating the standard deviation of locations of a feature point which is tracked over a plurality of frames during a unit time.

If the conditions of the operation S1945 are satisfied, the processor 270 may apply limits of the maximum viewing angle in S1946, by reflecting the margin which is set in S1943.

If any one of the conditions of the operation S1945 is not satisfied, the processor 270 may adjust the size of the margin in S1947.

For example, the processor 270 may adjust a mm to between 0 mm and 20 mm in S1943.

Next, the processor 270 may modify an algorithm and hardware in S1948 and S1949.

Modifying an algorithm may be adjusting at least one of a face detection algorithm, a feature detection algorithm, and a head pose detection algorithm.

Modifying hardware may be adjusting at least one of exposure time setting of a camera included in the internal camera 220, setting of in-vehicle illumination, and blocking external light.

The processor 270 may provide a control signal to modify hardware of a different device included in the vehicle 100 through the interface unit 245.

Figure 19D:
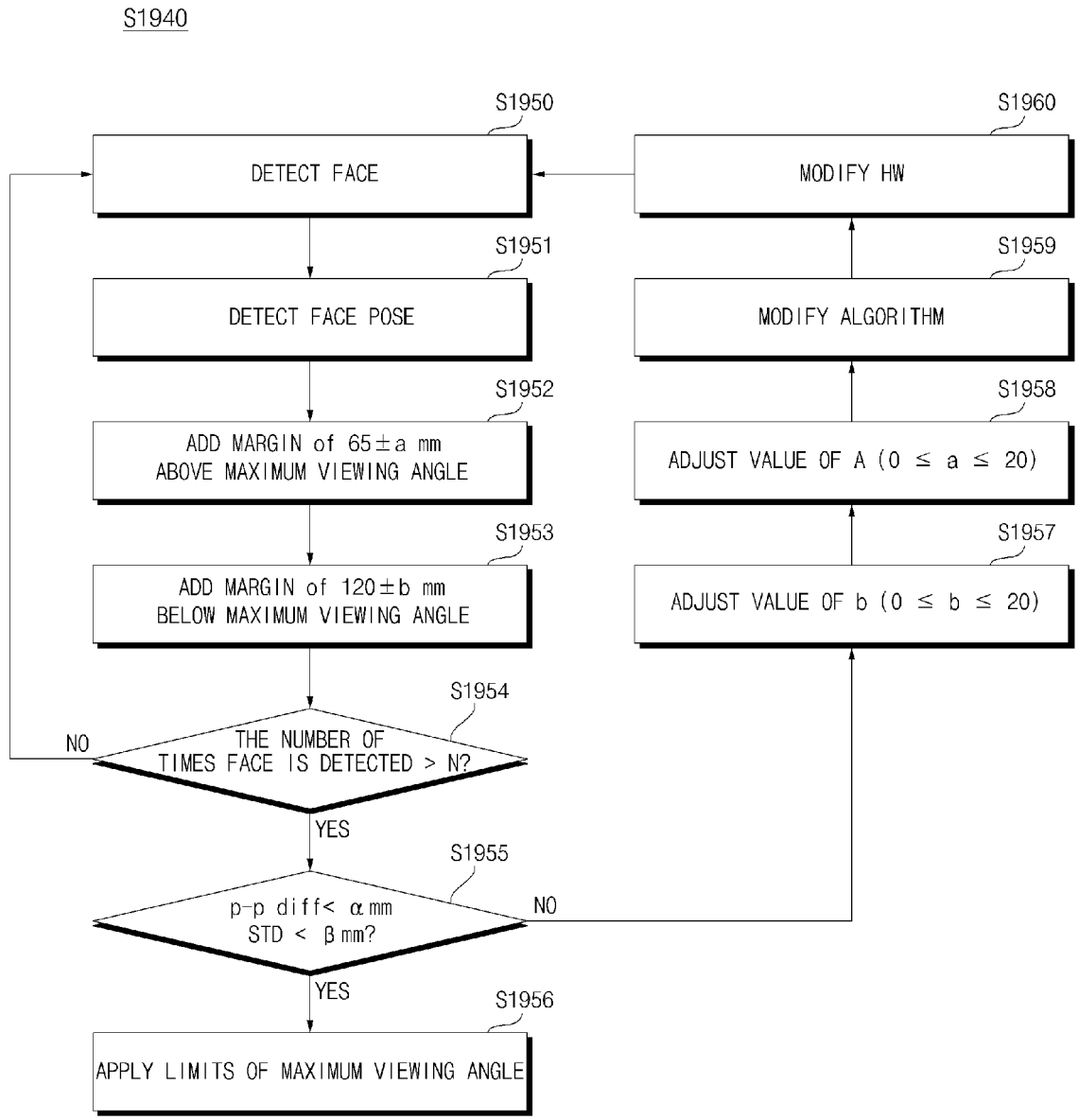

Referring to FIG. 19D, for provision of valid stereoscopic content, both eyes of a user should be detected. To this end, a margin needs to be set on both sides of the camera in a vertical direction (for example, an overall height direction).

FIG. 19D is a diagram for explanation of an operation of setting a margin in a vertical direction (for example, an overall height direction).

When a virtual head box is preset, the processor 270 may detect a user's face based on an image of the inside of the vehicle 100 in S1950.

For example, the processor 270 may detect the user's entire face outline, and detect the user's face by comparing the detected entire face outline with data stored in the memory 240.

For example, the processor 270 may detect a feature point corresponding to at least one of an eye, a nose, lips, and an ear, and detect the user's face based on the detected feature point.

The processor 270 may detect a pose of the user's head in S1951.

For example, the processor 270 may detect a pose of the user's head based on a pose of the user's entire face outline.

For example, the processor 270 may detect a pose of the user's head based on a feature point corresponding to at least one of an eye, a nose, lips, and an ear.

The processor 270 may set a margin of a preset value above the maximum viewing angle of the camera in S1952.

For example, the processor 270 may set a margin of 65±a mm in an upward direction.

The processor 270 may set a margin of a preset value below the maximum viewing angle of the camera in S1953.

For example, the processor 270 may set margin of 120±b mm in a downward direction.

The processor 270 may count the number of times the user's face is detected, and determine whether the counted number of times is greater than a preset value in S1954.

If the counted number of times is greater than the preset value, the processor 270 may perform the operation S1955.

If the counted number of times is not greater than the preset value, the processor 270 may return to the operation S1950.

In some embodiments, the operation S1954 may be omitted.

The processor 270 may determine whether a feature point variation difference (p-p diff) is smaller than a reference value in S1955. The feature point variation difference may be defined as a value obtained by calculating difference between two locations with the greatest variation among locations of a feature point which is tracked over a plurality of frames during a unit time.

The processor 270 may determine whether the standard deviation STD of variation of the feature point is smaller than a reference value in S1955. The standard deviation may be a value obtained by calculating a standard deviation of locations of a feature tracked over a plurality of frames during a unit time.

If the conditions of the operation S1955 are satisfied, the processor 270 may apply limits of the maximum viewing angle in S1956 by reflecting the margin which is set in operations S1952 and S1953.

If any one of the conditions of the operation S1955 is not satisfied, the processor 270 may adjust the size of the margin in S1957 and S1958.

For example, the processor 270 may adjust a mm to between 0 mm and 20 mm.

For example, the processor 270 may adjust b mm to between 0 mm and 20 mm in S1953.

Next, the processor 270 may modify an algorithm and hardware in S1959 and S1960.

Modifying an algorithm may be adjusting at least one of a face detection algorithm, a feature detection algorithm, and a head pose detection algorithm.

Modifying an algorithm may be adjusting at least one of exposure time setting of a camera included in the internal camera 220, setting of in-vehicle illumination, and blocking external light.

The processor 270 may provide a control signal to modify hardware to a different device included in the vehicle 100 through the interface unit 245.

Figure 19E:
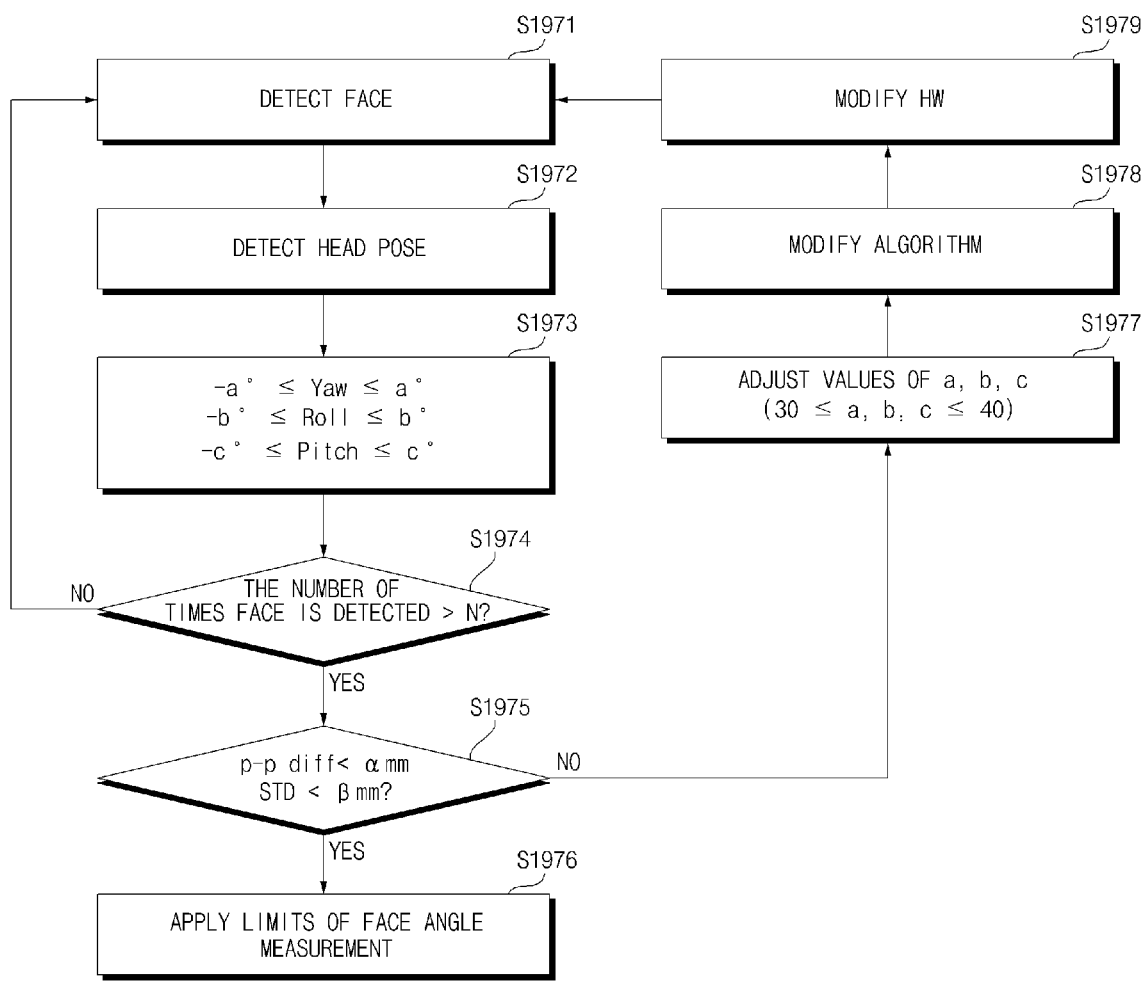

Referring to FIG. 19E, yaw, roll, or pitch of a user's head should be within a reference range, so that stereoscopic content is provided.

FIG. 19E is a diagram for explanation of setting a range of yaw, roll, and pitch of the user's head.

When a virtual head box is preset, the processor 270 may detect the user's head based on an image of the inside of the vehicle 100 in S1971.

For example, the processor 270 may detect the user's entire face outline, and detect the user's face by comparing the detected entire face outline with data stored in the memory 240.

For example, the processor 270 may detect a feature point corresponding to at least one of an eye, a nose, lips, and an ear, and detect the user's face based on the detected feature point.

The processor 270 may detect a pose of the user's head in S1972.

For example, the processor 270 may detect a pose of the user's head based on a pose of the user's entire face outline For example, the processor 270 may detect a pose of the user's head based on a feature point corresponding to at least one of an eye, a nose, lips, and an ear.

The processor 270 may set a range for rotation of a user's head. The processor 270 may set a range of yaw of the user's head to between –a° and a°. The processor 270 may set a range of roll of the user's head to between –b° and b°. The processor 270 may set a range of pitch of the user's head to –c° and c° in S1973.

The processor 270 may count the number of times the user's face is detected, and determine whether the counted number of times is greater than a preset value in S1974.

When the counted number of times is greater than the preset value, the processor 270 may perform the operation S1975.

When the counted number of times is not greater than the preset value, the processor 270 may return to the operation S1971.

In some embodiments, the operation S1974 may be omitted.

The processor 270 may determine whether a feature variation difference (p-p diff) is smaller than a reference value in S1975. The feature point variation difference may be defined as a value obtained by calculating difference between two locations with the greatest variation among locations of a feature point which is tracked over a plurality of frames during a unit time.

The processor 270 may determine whether the standard deviation STD of variation of the feature point is smaller than a reference value in S1975. The standard deviation may be a value obtained by calculating the standard deviation of locations of the feature which is tracked over a plurality of frames during a unit time.

If the conditions of the operation S1975 are satisfied, the processor 270 may apply limits of the range of rotation of the user's head in S1976, the limits which are set in the operation S1973.

If any one of the conditions of the operation S1975 is not satisfied, the processor 270 may adjust the limits of the range of rotation of the user's head in S1977.

For example, the processor 270 may adjust the value of "a" to between 30° and 40° in S1973.

For example, the processor 270 may adjust the value of "b" to between 30° and 40° in 1973.

For example, the processor 270 may adjust the value of "c" to between 30° and 40° in S1973.

Next, the processor 270 may modify an algorithm and hardware in S1978 and S1979.

Modifying an algorithm may be adjusting at least one of a face detection algorithm, a feature detection algorithm, and a head pose detection algorithm.

Modifying hardware may be adjusting at least one of exposure time setting of a camera included in the internal camera 220, setting of in-vehicle illumination, and blocking external light.

The processor 270 may provide a control signal to modifying hardware to a different device included in the vehicle 100 through the interface unit 245.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface apparatus for a vehicle, the apparatus comprising:
   a display unit configured to output stereoscopic content;
   an internal camera configured to acquire an image of an inside of the vehicle; and
   a processor configured to:

detect an image of a head of a user of the vehicle based on the image of the inside of the vehicle, generate pose information and movement information of the head based on the image of the head, and set a virtual head box based on a method for implementing the stereoscopic content, the pose information, and the movement information, wherein the virtual head box is defined as a three-dimensional (3D) space in which the head needs to be positioned so that the user is able to see the stereoscopic content with bare eyes of the user, wherein the display unit comprises:

an image output unit, in which blocks including at least one pixel are alternatively arranged, and configured to display a multi-view image for a first frame duration; and a filter configured to form barrier areas and light transmission areas which are formed to correspond to the multi-view image for the first frame duration.

2. The user interface apparatus according to claim 1, wherein the processor is configured to control the display unit so that the stereoscopic content is output based on one of a lenticular method, a microlens array method, and a parallax method as the method for implementing the stereoscopic image.

3. The user interface apparatus according to claim 1, wherein the processor is configured to detect a preset feature point from the image of the head, and generate the pose information of the head and the movement information of the head based on the detected preset feature point.

4. The user interface apparatus according to claim 3, wherein the preset feature point comprises at least one of a first point of a left eye of the user, a second point of the left eye of the user, a first point of a right eye of the user, a second point of the right eye of the user, a first point of lips of the user, and a second point of the lips of the user.

5. The user interface apparatus according to claim 3, wherein the processor is configured to track a feature point detected from a plurality of frames and generate information on a rotation of the head based on the tracked feature point.

6. The user interface apparatus according to claim 5, wherein the processor is configured to determine whether the rotation of the head is within a reference range.

7. The user interface apparatus according to claim 6, wherein it is determined that the rotation of the head is within the reference range, the processor is configured to maintain a preset position and a size of the virtual head box.

8. The user interface apparatus according to claim 6, wherein when it is determined that the rotation of the head is beyond the reference range, the processor is configured to control the display unit to convert the stereoscopic content into flat content.

9. The user interface apparatus according to claim 1, wherein the processor is configured to:

detect the preset feature point from a plurality of frames;

calculate a mean and a standard deviation of locations of the preset feature point in the plurality of frames; and generate the movement information of the head based on the mean and the standard deviation.

10. The user interface apparatus according to claim 9, wherein the processor is configured to:

divide the image of the inside of the vehicle into a first region and a second region based on a viewing angle; and determine whether the preset feature point is located in one of the first region and the second region.

11. The user interface apparatus according to claim 10, wherein, when it is determined that the preset feature point is located in the first region, the processor is configured to determine whether the mean and the standard deviation are within a reference range in the first region.

12. The user interface apparatus according to claim 11, wherein, when it is determined that the mean and the standard deviation are within the reference range in the first region, the processor is configured to maintain a preset position and a size of the virtual head box.

13. The user interface apparatus according to claim 11, wherein, when it is determined that at least one of the mean and the standard deviation is beyond the reference range in the first region, the processor is configured to adjust a preset position of the virtual head box to an adjusted position based on the preset feature point.

14. The user interface apparatus according to claim 13, wherein the processor is configured to adjust positions of the barrier areas and the light transmission areas based on the adjusted position of the virtual head box.

15. The user interface apparatus according to claim 10, wherein, when it is determined that the preset feature point is located in the second region, the processor is configured to determine whether the mean and the standard deviation are within a reference range in the second region.

16. The user interface apparatus according to claim 15, wherein when it is determined that the mean and the standard deviation are within the reference range in the second region, the processor is configured to maintain a preset position and a size of the virtual head box.

17. The user interface apparatus according to claim 15, wherein, when it is determined that at least one of the mean and the standard deviation is beyond the reference range in the second region, the processor is configured to adjust a preset size of the virtual head box based on the mean and the standard deviation.

18. A vehicle comprising the user interface apparatus according to claim 1.

19. The user interface apparatus according to claim 1, wherein the processor is further configured to preset the virtual head box at the inside of the vehicle, and subsequently detect the head of the user based the image of the inside of the vehicle.

* * * * *